US012586238B2

(12) United States Patent
Niesen et al.

(10) Patent No.: US 12,586,238 B2
(45) Date of Patent: Mar. 24, 2026

(54) ESTIMATING AND TRANSMITTING OBJECTS CAPTURED BY A CAMERA

(71) Applicant: QUALCOMM Incorporated, San Diego, CA (US)

(72) Inventors: Urs Niesen, Berkeley Heights, NJ (US); Mandar Narsinh Kulkarni, Bridgewater, NJ (US); Jubin Jose, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 354 days.

(21) Appl. No.: 18/311,187

(22) Filed: May 2, 2023

(65) Prior Publication Data

US 2023/0360258 A1 Nov. 9, 2023

Related U.S. Application Data

(60) Provisional application No. 63/364,185, filed on May 4, 2022.

(51) Int. Cl.
| | |
|---|---|
| *G06T 7/73* | (2017.01) |
| *G06T 7/50* | (2017.01) |
| *G06T 7/62* | (2017.01) |

(52) U.S. Cl.
CPC ................. *G06T 7/73* (2017.01); *G06T 7/50* (2017.01); *G06T 7/62* (2017.01); *G06T 2207/10028* (2013.01); *G06T 2207/30252* (2013.01)

(58) Field of Classification Search
CPC .... G06T 7/73; G06T 7/62; G06T 7/50; G06T 2207/10028; G06T 2207/30252
See application file for complete search history.

(56) References Cited

U.S. PATENT DOCUMENTS

| | | | |
|---|---|---|---|
| 9,179,047 B2 * | 11/2015 | Dani ...................... | G01B 11/24 |
| 9,865,043 B2 * | 1/2018 | Robinson ............. | H04N 23/741 |

(Continued)

FOREIGN PATENT DOCUMENTS

| | | |
|---|---|---|
| CN | 112686953 A | 4/2021 |
| KR | 102221695 B1 | 3/2021 |
| WO | 2020049089 A1 | 3/2020 |

OTHER PUBLICATIONS

International Search Report and Written Opinion—PCT/US2023/020898—ISA/EPO—Aug. 3, 2023.

*Primary Examiner* — Gregory M Desire
(74) *Attorney, Agent, or Firm* — Procopio, Cory, Hargreaves & Savitch LLP

(57) ABSTRACT

A wireless device may obtain, from a camera, an image with at least one captured object, which may include a plurality of dimensions. The image may include a 2D projection of the at least one captured object. The wireless device may calculate at least one dimension of the plurality of dimensions of the at least one captured object based on the 2D projection of the at least one captured object. The wireless device may estimate an inverse depth of the plurality of dimensions of the at least one captured object based on information associated with one or more properties of the camera or of at least one reference object associated with the at least one captured object. The wireless device may transmit an indication of the plurality of dimensions of the at least one captured object including the calculated at least one dimension and the estimated inverse depth.

30 Claims, 11 Drawing Sheets

(56) References Cited

U.S. PATENT DOCUMENTS

| | | | |
|---|---|---|---|
| 11,270,460 B2 * | 3/2022 | Qiao | ......................... G06T 7/74 |
| 11,276,191 B2 * | 3/2022 | Lukierski | ............. G05D 1/2465 |
| 11,868,439 B2 * | 1/2024 | Guizilini | ............. G05D 1/0088 |
| 2012/0197713 A1 | 8/2012 | Stroila et al. | |
| 2013/0157682 A1 | 6/2013 | Ling | |
| 2021/0383141 A1 | 12/2021 | Togashi | |

* cited by examiner $\Phi$ = Azimuth angle of departure (A-AoD)
$\theta$ = Zenith angle of departure (Z-AoD)
$\rho$ = Distance
$\Phi'$ = Azimuth angle of arrival (A-AoA)
$\theta'$ = Zenith angle of arrival (Z-AoA)

608

606

612

610

625

624

623

622

603

601

602

198 dimension
generator
component

600

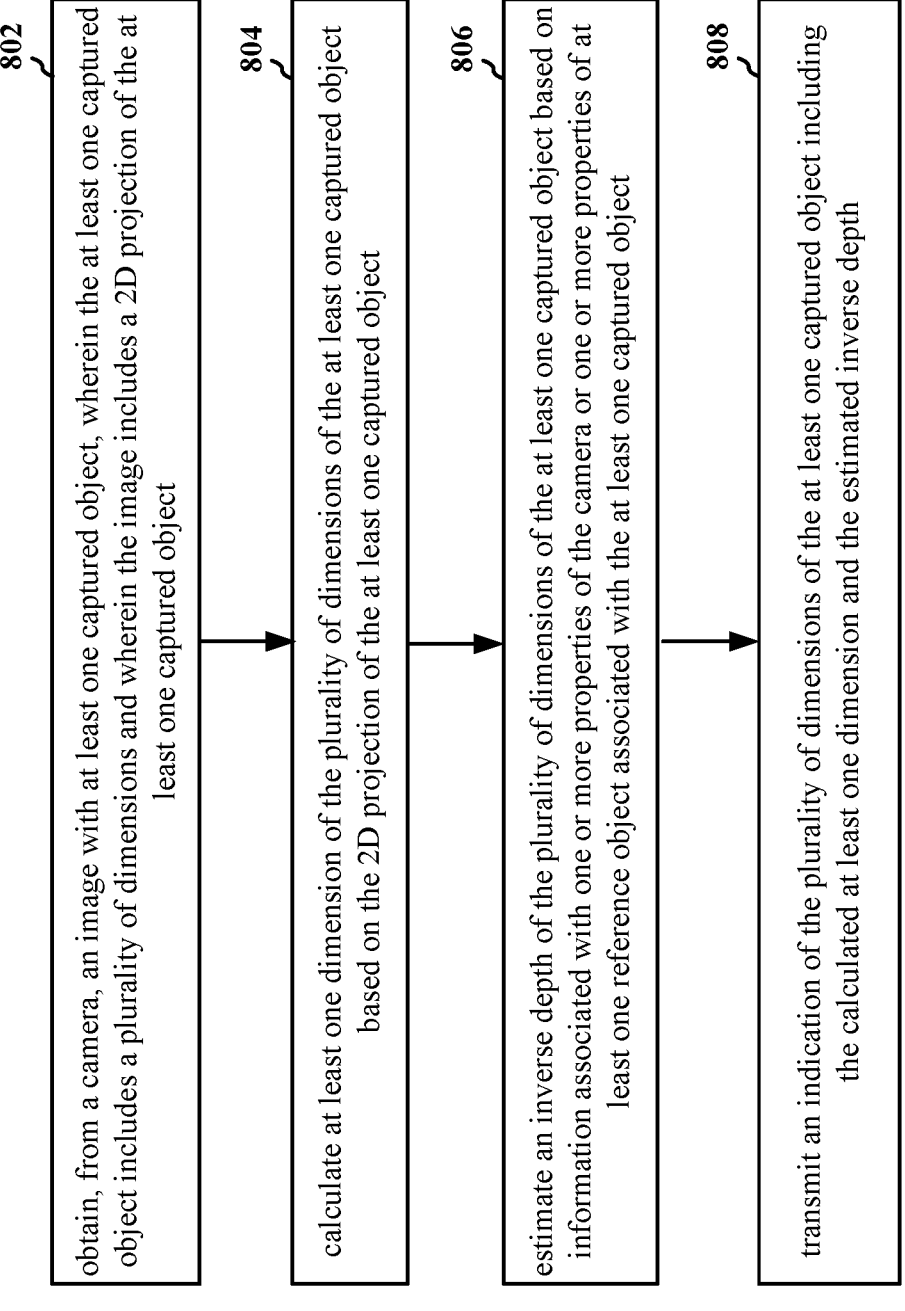

802 obtain, from a camera, an image with at least one captured object, wherein the at least one captured object includes a plurality of dimensions and wherein the image includes a 2D projection of the at least one captured object

804 calculate at least one dimension of the plurality of dimensions of the at least one captured object based on the 2D projection of the at least one captured object

806 estimate an inverse depth of the plurality of dimensions of the at least one captured object based on information associated with one or more properties of the camera or one or more properties of at least one reference object associated with the at least one captured object

808 transmit an indication of the plurality of dimensions of the at least one captured object including the calculated at least one dimension and the estimated inverse depth

Figure 9:
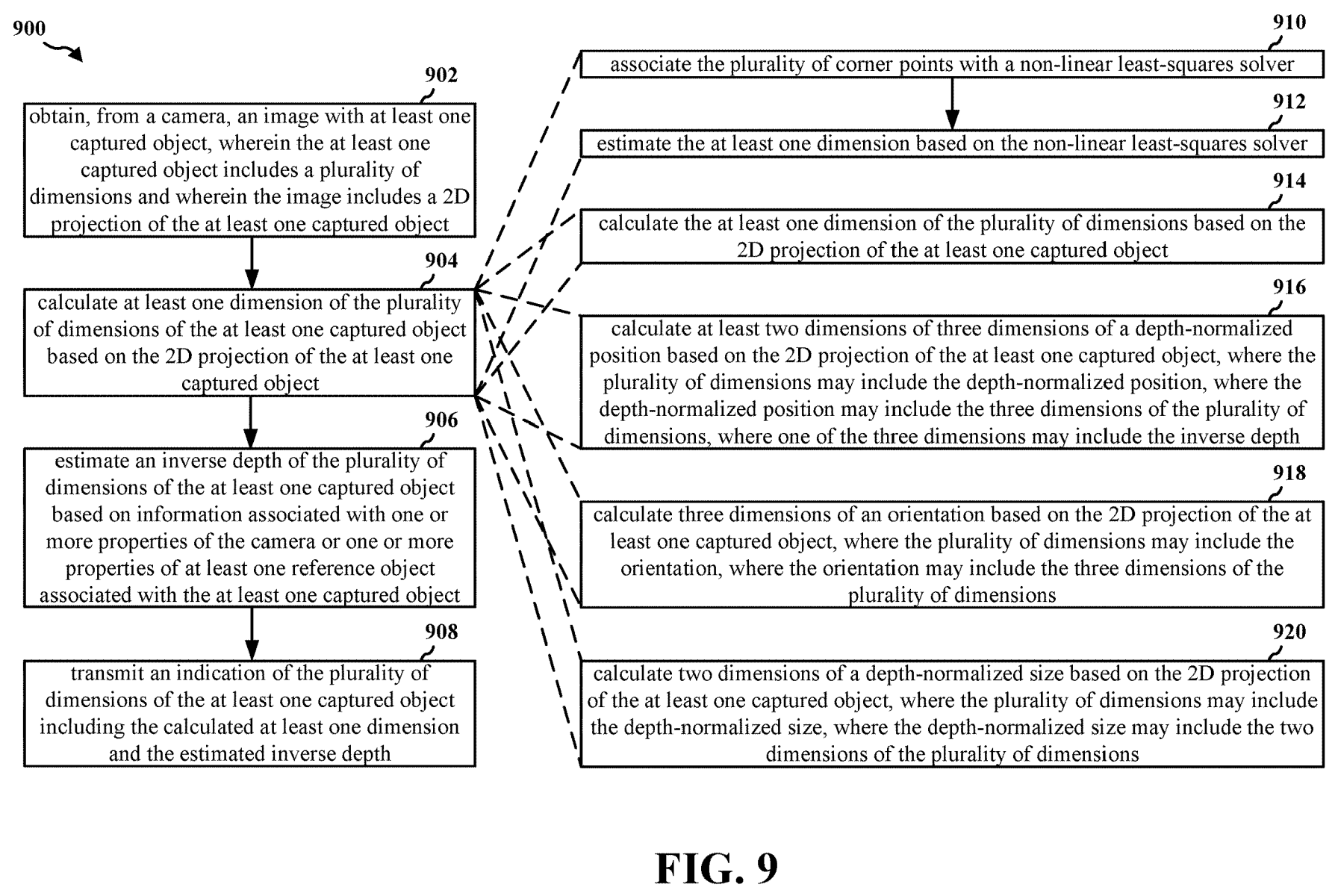

910 — associate the plurality of corner points with a non-linear least-squares solver 912 — estimate the at least one dimension based on the non-linear least-squares solver 914 — calculate the at least one dimension of the plurality of dimensions based on the 2D projection of the at least one captured object 916 — calculate at least two dimensions of three dimensions of a depth-normalized position based on the 2D projection of the at least one captured object, where the plurality of dimensions may include the depth-normalized position, where the depth-normalized position may include the three dimensions of the plurality of dimensions, where one of the three dimensions may include the inverse depth 918 — calculate three dimensions of an orientation based on the 2D projection of the at least one captured object, where the plurality of dimensions may include the orientation, where the orientation may include the three dimensions of the plurality of dimensions 920 — calculate two dimensions of a depth-normalized size based on the 2D projection of the at least one captured object, where the plurality of dimensions may include the depth-normalized size, where the depth-normalized size may include the two dimensions of the plurality of dimensions

900

902 — obtain, from a camera, an image with at least one captured object, wherein the at least one captured object includes a plurality of dimensions and wherein the image includes a 2D projection of the at least one captured object 904 — calculate at least one dimension of the plurality of dimensions of the at least one captured object based on the 2D projection of the at least one captured object 906 — estimate an inverse depth of the plurality of dimensions of the at least one captured object based on information associated with one or more properties of the camera or one or more properties of at least one reference object associated with the at least one captured object 908 — transmit an indication of the plurality of dimensions of the at least one captured object including the calculated at least one dimension and the estimated inverse depth

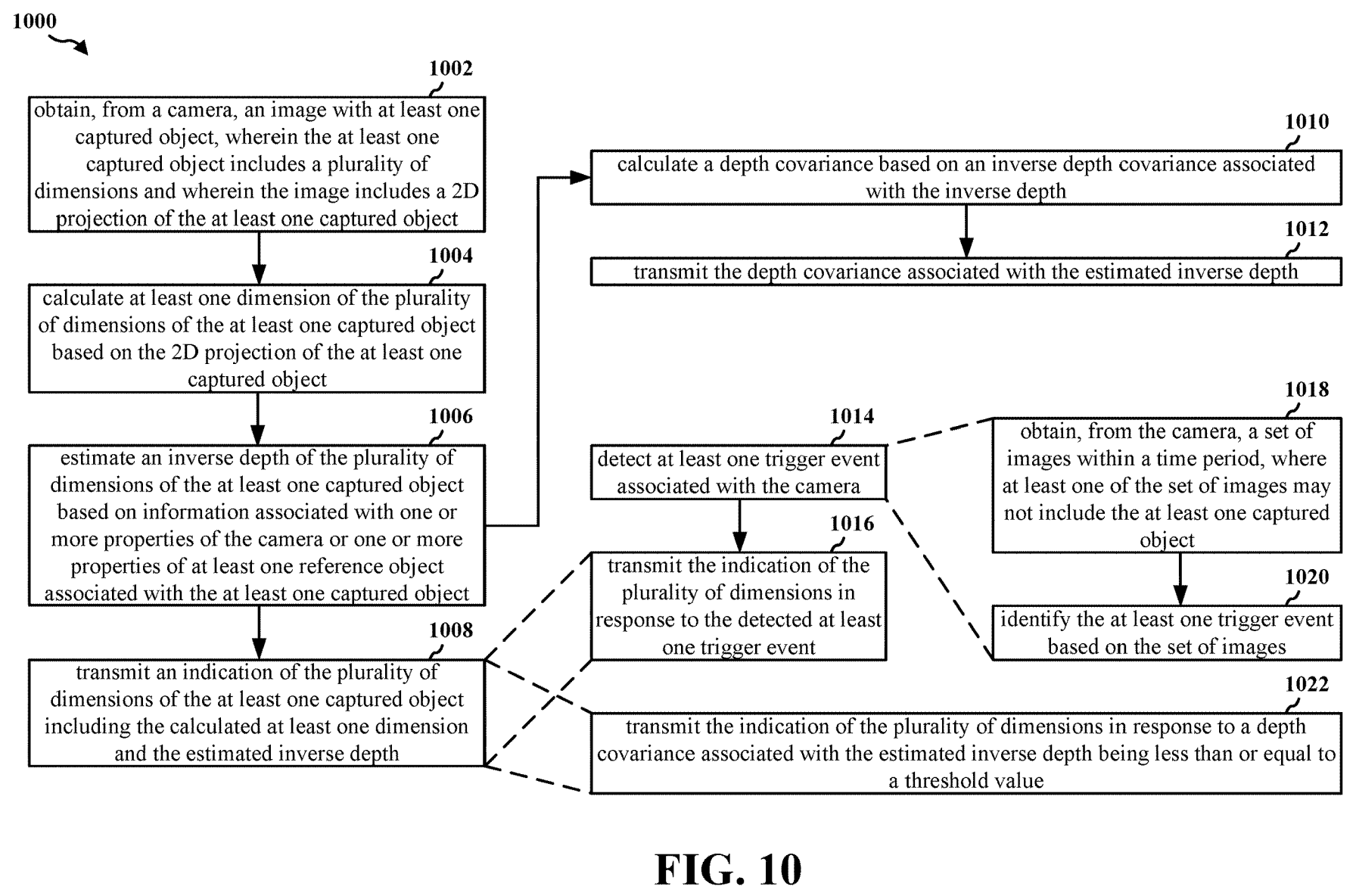

1002 — obtain, from a camera, an image with at least one captured object, wherein the at least one captured object includes a plurality of dimensions and wherein the image includes a 2D projection of the at least one captured object 1004 — calculate at least one dimension of the plurality of dimensions of the at least one captured object based on the 2D projection of the at least one captured object 1006 — estimate an inverse depth of the plurality of dimensions of the at least one captured object based on information associated with one or more properties of the camera or one or more properties of at least one reference object associated with the at least one captured object 1008 — transmit an indication of the plurality of dimensions of the at least one captured object including the calculated at least one dimension and the estimated inverse depth 1010 — calculate a depth covariance based on an inverse depth covariance associated with the inverse depth 1012 — transmit the depth covariance associated with the estimated inverse depth 1014 — detect at least one trigger event associated with the camera 1016 — transmit the indication of the plurality of dimensions in response to the detected at least one trigger event 1018 — obtain, from the camera, a set of images within a time period, where at least one of the set of images may not include the at least one captured object 1020 — identify the at least one trigger event based on the set of images 1022 — transmit the indication of the plurality of dimensions in response to a depth covariance associated with the estimated inverse depth being less than or equal to a threshold value

FIG. 10

ESTIMATING AND TRANSMITTING OBJECTS CAPTURED BY A CAMERA

CROSS REFERENCE TO RELATED APPLICATION(S)

This application claims the benefit of and priority to U.S. Provisional Application Ser. No. 63/364,185, entitled "METHODS FOR ESTIMATING AND TRANSMITTING OBJECTS CAPTURED BY A CAMERA" and filed on May 4, 2022, which is expressly incorporated by reference herein in its entirety.

TECHNICAL FIELD

The present disclosure relates generally to communication systems, and more particularly, to transmission of data captured by image-capturing devices.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may have a memory and at least one processor coupled to the memory. Based at least in part on information stored in the memory, the at least one processor may be configured to obtain, from a camera, an image with at least one captured object, which may include a plurality of dimensions. The image may include a two-dimensional (2D) projection of the at least one captured object. The at least one processor may be further configured to calculate at least one dimension of the plurality of dimensions of the at least one captured object based on the 2D projection of the at least one captured object. The at least one processor may be further configured to estimate an inverse depth of the plurality of dimensions of the at least one captured object based on information associated with one or more properties of the camera or of at least one reference object associated with the at least one captured object. The at least one processor may be further configured to transmit an indication of the plurality of dimensions of the at least one captured object including the calculated at least one dimension and the estimated inverse depth.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 8 is a flowchart of a method of wireless communication.

FIG. 9 is a flowchart of a method of wireless communication.

FIG. 10 is a flowchart of a method of wireless communication.

DETAILED DESCRIPTION

Figure 1:
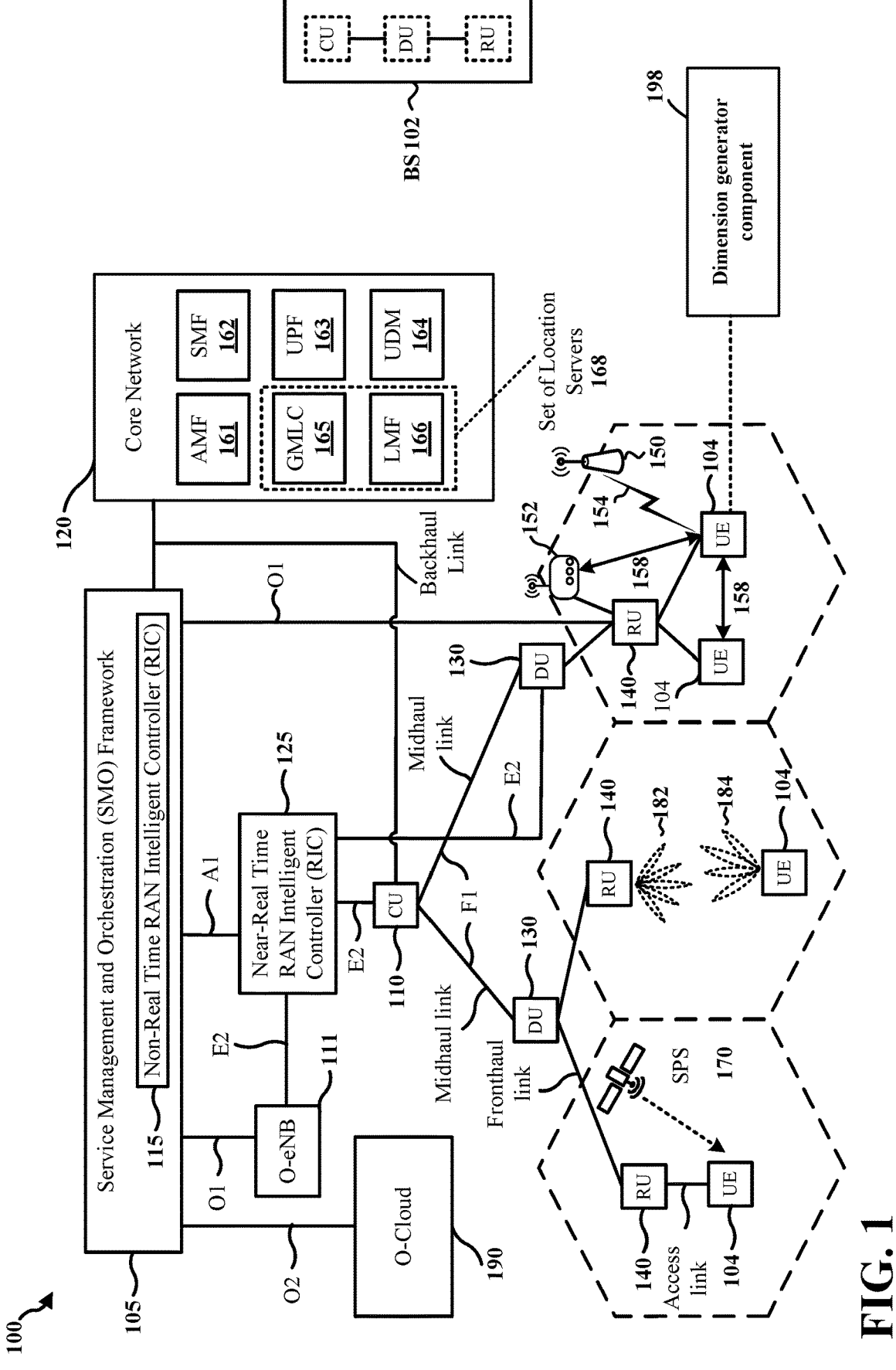
FIG. 1 is a diagram illustrating an example of a wireless communications system and an access network.

Generating accurate street maps may be useful to enable autonomous driving and advanced driver assistance system (ADAS) applications on vehicles. Such street maps may be generated by collecting image data from mobile wireless devices, such as vehicles having cameras configured to gather image data. Such image data may be used to estimate the road environment around the vehicle when combined with location data of the vehicle. However, transmitting image data from a moving vehicle may utilize a lot of wireless resources. Transmitting attributes of objects in an image, such as dimensions of the objects, may be a more efficient use of wireless resources. Such attributes may include, for example, a location of the vehicle, a direction that the camera is facing, and dimensions of three-dimensional (3D) objects (e.g., traffic signs, traffic signals, billboards) in an image.

Each object in an image may be described using a plurality of dimensions. A non-linear least-squares solver may be used to calculate one or more dimensions of an object captured by an image. However, describing such objects using dimensions such as size, position, and orientation may be impractical since many of those dimensions may not be calculated without capturing a plurality of images and comparing those images against one another. Capturing a plurality of images about an object may delay initialization of the non-linear least-squares solver. In addition, describing such object using a position vector capable of conveying negative depths may allow for impossible negative depths in calculations using the non-linear least-squares solver. Describing such objects using dimensions based on an inverse depth of the object may allow a device to calculate more dimensions of a non-linear least-squares solver based on a single captured image. A device analyzing an object in an image may calculate the dimensions other than the inverse depth, and may estimate the inverse depth using a reasonable estimate to the inverse depth. The non-linear least-squares solver may be initialized with the calculated and estimated dimensions, and the estimate of the inverse depth may be improved and refined using data from subsequent images. As an inverse depth is used, impossible values, such as negative depth values or zero depth values, may not be considered by the non-linear least-squares solver.

A wireless device may obtain, from a camera, an image with at least one captured object, which may include a plurality of dimensions. The image may include a two-dimensional (2D) projection of the at least one captured object. The wireless device may calculate at least one dimension of the plurality of dimensions of the at least one captured object based on the 2D projection of the at least one captured object. The wireless device may estimate an inverse depth of the plurality of dimensions of the at least one captured object based on information associated with one or more properties of the camera or of at least one reference object associated with the at least one captured object. The wireless device may transmit an indication of the plurality of dimensions of the at least one captured object including the calculated at least one dimension and the estimated inverse depth.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit—User Plane (CU-UP)), control plane functionality (i.e., Central Unit—Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. Such UEs 104 may also communicate with a Road Side Unit (RSU) 152 using a D2D communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a dimension generator component 198 that may be configured to obtain, from a camera, an image with at least one captured object, where the at least one captured object includes a plurality of dimensions and where the image includes a two-dimensional (2D) projection of the at least one captured object. The dimension generator component 198 may also be configured to calculate at least one dimension of the plurality of dimensions of the at least one captured object based on the 2D projection of the at least one captured object. The dimension generator component 198 may also be configured to estimate an inverse depth of the plurality of dimensions of the at least one captured object based on information associated with one or more properties of the camera or one or more properties of at least one reference object associated with the at least one captured object. The dimension generator component 198 may also be configured to transmit an indication of the plurality of dimensions of the at least one captured object including the calculated at least one dimension and the estimated inverse depth. The plurality of dimensions may include at least one calculated dimension and an estimated inverse depth of the captured object. Although the following description may be focused on traffic signs, the concepts described herein may be applicable to any three-dimensional (3D) object captured by a camera that captures two-dimensional (2D) images, such as advertising boards or traffic lights.

Figures 2A, 2B, 2C, 2D:
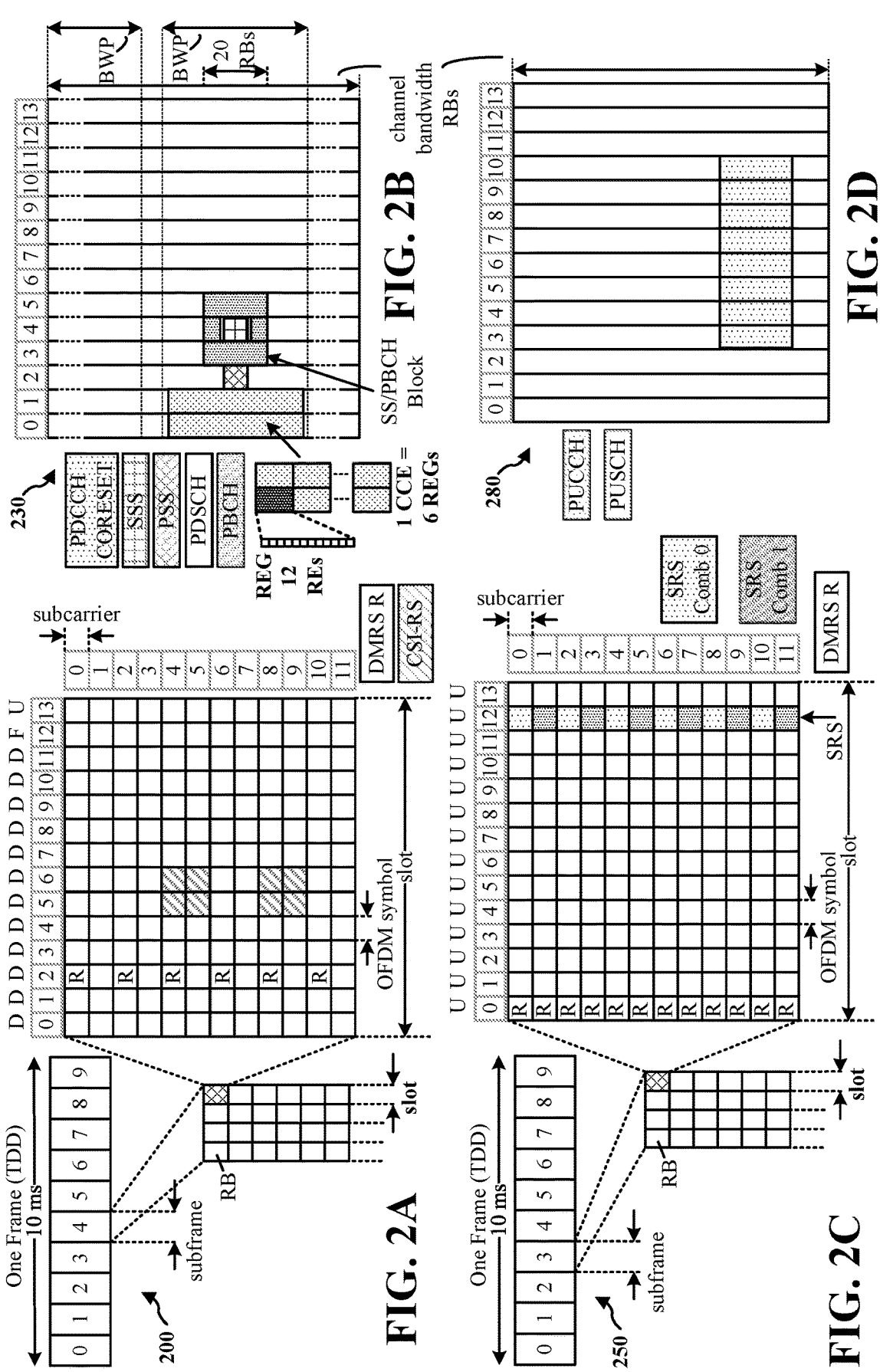
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu *15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 5:
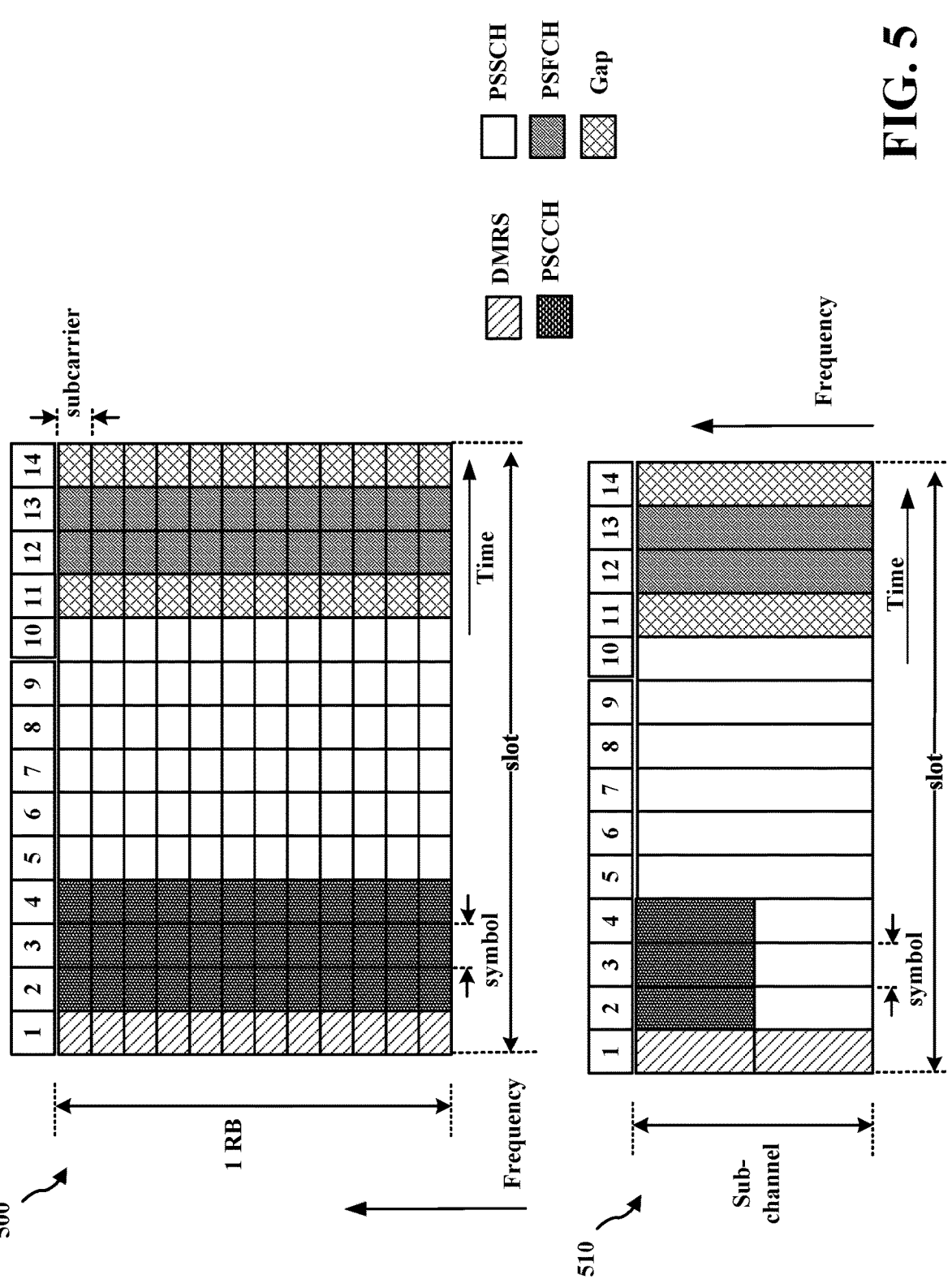
FIG. 5 is a diagram illustrating examples of sidelink slot structures.

FIG. 5 includes diagrams 500 and 510 illustrating example aspects of slot structures that may be used for SL communication (e.g., between UEs 104, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 5 is merely one example, and other SL communication may have a different frame structure and/or different channels for SL communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 500 illustrates a single resource block of a single slot transmission, e.g., which may correspond to a 0.5 ms transmission time interval (TTI). A physical SL control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may include 10, 15, 20, 25, 50, 75, or 100 PRBs, for example. The resources for an SL transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 510 in FIG. 5 illustrates an example in which the PSCCH occupies about 50% of a subchannel, as one example to illustrate the concept of PSCCH occupying a portion of a subchannel. The physical SL shared channel (PSSCH) occupies at least one subchannel. The PSCCH may include a first portion of SL control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 5, some of the REs may include control information in PSCCH and some REs may include demodulation RS (DMRS). At least one symbol may be used for feedback. FIG. 5 illustrates examples with two symbols for a physical SL feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may include the data message described herein. The position of any of the data, DMRS, SCI, feedback, gap symbols, and/or LBT symbols may be different than the example illustrated in FIG. 5. Multiple slots may be aggregated together in some aspects.

Figure 3:
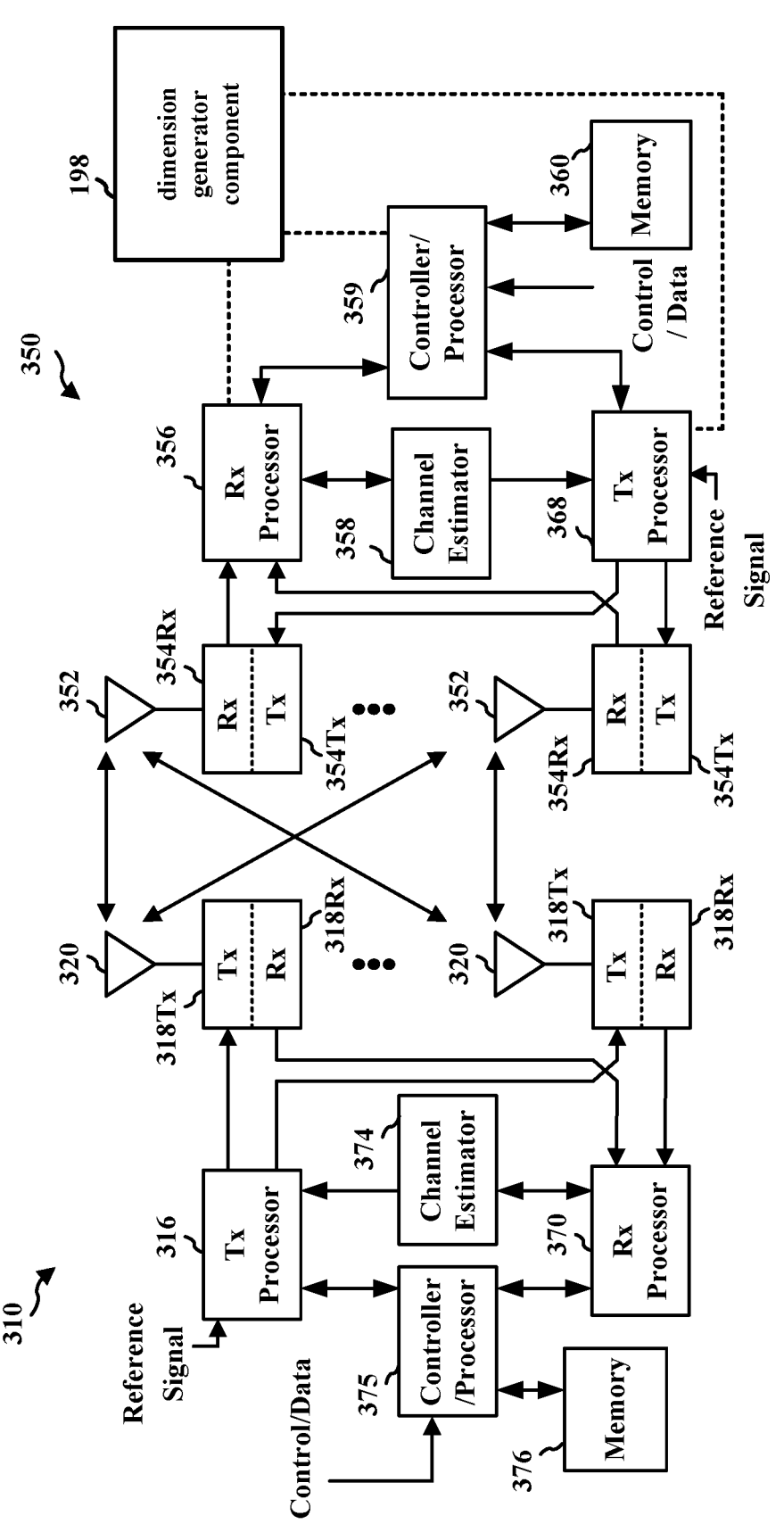
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (Tx) processor 316 and the receive (Rx) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The Tx processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (Rx) processor 356. The Tx processor 368 and the Rx processor 356 implement layer 1 functionality associated with various signal processing functions. The Rx processor 356 may perform spatial processing on the information to recover any spatial streams destined for the UE 350. If multiple spatial streams are destined for the UE 350, they may be combined by the Rx processor 356 into a single OFDM symbol stream. The Rx processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the Tx processor 368 to select the appropriate coding and modulation schemes, and to facilitate spatial processing. The spatial streams generated by the Tx processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a Rx processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the Tx processor 368, the Rx processor 356, and the controller/processor 359 may be configured to perform aspects in connection with the dimension generator component 198 of FIG. 1.

Figure 4:
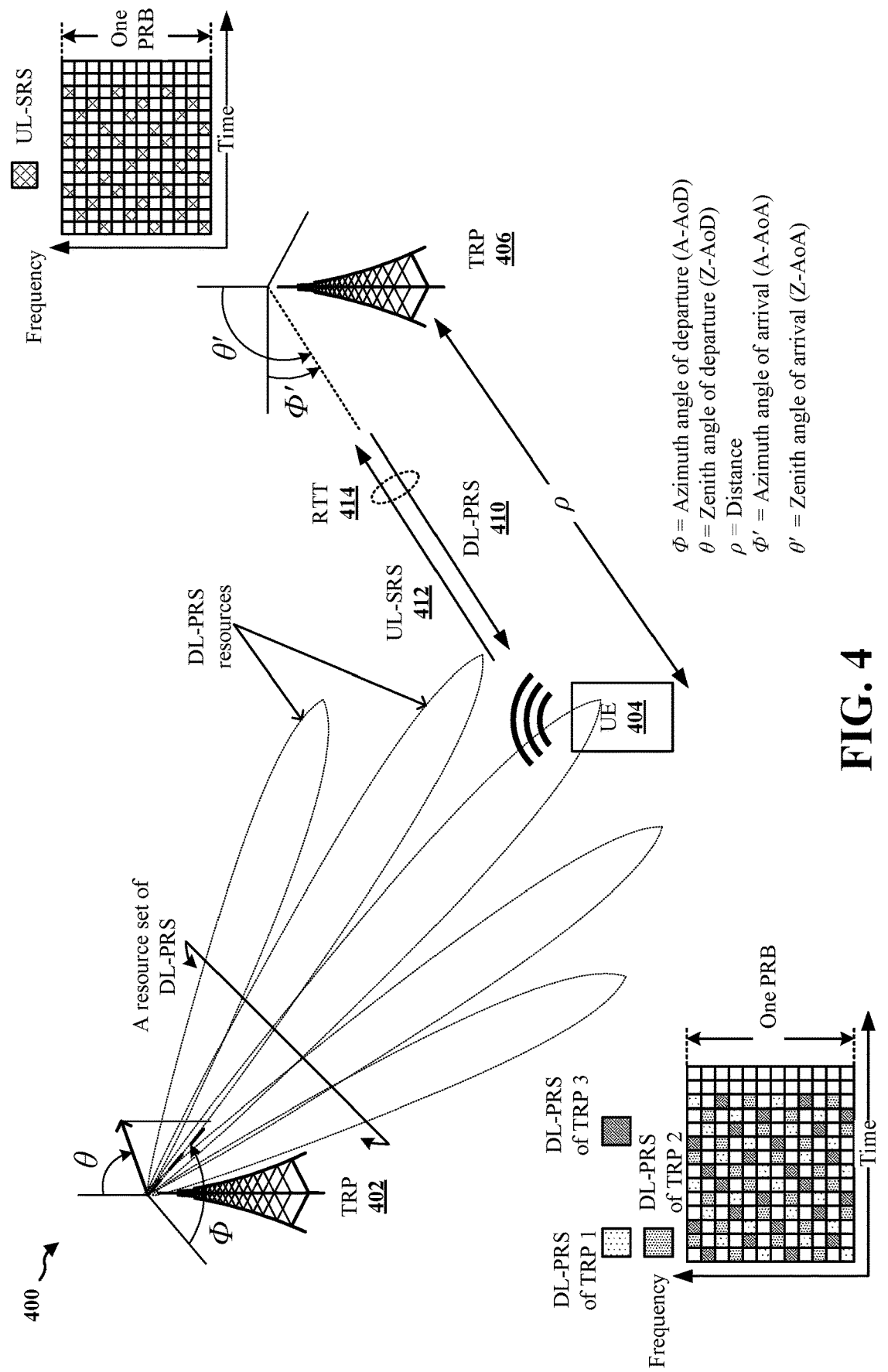
FIG. 4 is a diagram illustrating an example of a UE positioning based on reference signal measurements.

FIG. 4 is a diagram 400 illustrating an example of a UE positioning based on reference signal measurements. The UE 404 may transmit UL-SRS 412 at time $T_{SRS\_Tx}$ and receive DL positioning reference signals (PRS) (DL-PRS) 410 at time $T_{PRS\_Rx}$. The TRP 406 may receive the UL-SRS 412 at time $T_{SRS\_Rx}$ and transmit the DL-PRS 410 at time $T_{PRS\_Tx}$. The UE 404 may receive the DL-PRS 410 before transmitting the UL-SRS 412, or may transmit the UL-SRS 412 before receiving the DL-PRS 410. In both cases, a positioning server (e.g., location server(s) 168) or the UE 404 may determine the RTT 414 based on $\|T_{SRS\_Rx}-T_{PRS\_Tx}|-|T_{SRS\_Tx}-T_{PRS\_Rx}\|$. Accordingly, multi-RTT positioning may make use of the UE Rx-Tx time difference measurements (i.e., $|T_{SRS\_Tx}-T_{PRS\_Rx}|$) and DL-PRS reference signal received power (RSRP) (DL-PRS-RSRP) of downlink signals received from multiple TRPs 402, 406 and measured by the UE 404, and the measured TRP Rx-Tx time difference measurements (i.e., $|T_{SRS\_Rx}-T_{PRS\_Tx}|$) and UL-SRS-RSRP at multiple TRPs 402, 406 of uplink signals transmitted from UE 404. The UE 404 measures the UE Rx-Tx time difference measurements (and optionally DL-PRS-RSRP of the received signals) using assistance data received from the positioning server, and the TRPs 402, 406 measure the gNB Rx-Tx time difference measurements (and optionally UL-SRS-RSRP of the received signals) using assistance data received from the positioning server. The measurements may be used at the positioning server or the UE 404 to determine the RTT, which is used to estimate the location of the UE 404. Other methods are possible for determining the RTT, such as for example using DL-TDOA and/or UL-TDOA measurements.

DL-AoD positioning may make use of the measured DL-PRS-RSRP of downlink signals received from multiple TRPs 402, 406 at the UE 404. The UE 404 measures the DL-PRS-RSRP of the received signals using assistance data received from the positioning server, and the resulting measurements are used along with the azimuth angle of departure (A-AoD), the zenith angle of departure (Z-AoD), and other configuration information to locate the UE 404 in relation to the neighboring TRPs 402, 406.

DL-TDOA positioning may make use of the DL reference signal time difference (RSTD) (and optionally DL-PRS-RSRP) of downlink signals received from multiple TRPs 402, 406 at the UE 404. The UE 404 measures the DL RSTD (and optionally DL-PRS-RSRP) of the received signals using assistance data received from the positioning server, and the resulting measurements are used along with other configuration information to locate the UE 404 in relation to the neighboring TRPs 402, 406.

UL-TDOA positioning may make use of the UL relative time of arrival (RTOA) (and optionally UL-SRS-RSRP) at multiple TRPs 402, 406 of uplink signals transmitted from UE 404. The TRPs 402, 406 measure the UL-RTOA (and optionally UL-SRS-RSRP) of the received signals using assistance data received from the positioning server, and the resulting measurements are used along with other configuration information to estimate the location of the UE 404.

UL-AoA positioning may make use of the measured azimuth angle of arrival (A-AoA) and zenith angle of arrival (Z-AoA) at multiple TRPs 402, 406 of uplink signals transmitted from the UE 404. The TRPs 402, 406 measure the A-AoA and the Z-AoA of the received signals using assistance data received from the positioning server, and the resulting measurements are used along with other configuration information to estimate the location of the UE 404.

Additional positioning methods may be used for estimating the location of the UE 404, such as for example, UE-side UL-AoD and/or DL-AoA. Note that data/measurements from various technologies may be combined in various ways to increase accuracy, to determine and/or to enhance certainty, to supplement/complement measurements, and/or to substitute/provide for missing information.

Generating accurate street maps may be useful to enable autonomous driving and advanced driver assistance system (ADAS) applications on vehicles. Such street maps may be generated by collecting image data from mobile devices, such as vehicles having cameras configured to gather image data. Such image data may be used to estimate the road environment around the vehicle collecting the image when combined with location data of the vehicle. However, transmitting image data from a moving vehicle may utilize a lot of wireless resources. Transmitting road estimates of an image to a central location, such as a server or a data center, may be a more efficient use of wireless resources. Such road estimates may include, for example, a location of the vehicle, a direction that the camera is facing, and attributes of 3D objects (e.g., traffic signs, traffic signals, billboards) captured for each image. The central location may fuse the estimates together to generate a coherent map estimate.

Figure 6:
FIG. 6 is a diagram illustrating a UE and a camera configured to capture at least one image and transmit a plurality of calculated dimensions of at least one three-dimensional (3D) object captured by the camera.

FIG. 6 shows a diagram 600 of a UE 602 and a camera 601 configured to capture at least one image. The camera 601 may be configured to capture one or more images about the UE 602, such as the first traffic sign 606, the road 608, the second traffic sign 610, and the tree 612. The camera 601 may be configured to capture a set of images within a time period, for example a set of images taken every 0.1 seconds for a full second. The camera 601 may be configured to capture a set of images periodically, for example a set of images taken every 0.1 second for a full second every five seconds. The camera 601 may provide the images to the UE 602 directly or indirectly. For example, camera 601 may be integrated into the UE 602 as a device of the UE 602 and may provide the image via a system bus, or the camera 601 may be configured to transmit one or more images to a storage on a drive, such as a hard drive of a vehicle, and the UE 602 may be configured to analyze images stored on the drive. The UE 602 may be configured to analyze one or more images captured by the camera 601 and transmit a transmission 603 having attributes of the image, such as a location of the UE 602 when the image was captured, an orientation or direction of the camera 601, one or more calculated dimensions of an object captured in the image, or a covariance matrix based on the one or more calculated dimensions of an object captured in the image. The diagonal of the covariance matrix may include the covariance for each of the calculated dimensions, and the other values in the covariance matrix may indicate the cross-correlation between states. The UE 602 may be configured to transmit the diagonal elements of the covariance matrix (e.g., eight scalar diagonal elements of an 8×8 extended matrix estimated using an extended Kalman filter).

In some aspects, the transmission 603 may include a set of calculated dimensions, for example seven calculated dimensions of the tuple $(\tau_{cf}, R_{cf}, \alpha_f)$ that does not include the inverse depth and an estimate of the inverse depth. The UE 602 may associate an inverse depth value with an inverse depth covariance value. The inverse depth covariance value may have an inverse relationship with the accuracy of the estimate, where a larger inverse depth covariance value indicates a lower accuracy of the estimate and a smaller inverse depth covariance value indicates a greater accuracy of the estimate. The UE 602 may have a mapping that associates inverse depth values with inverse depth covariance values. For example, an inverse depth value between 1/1 and 1/20 may be associated with an inverse depth covariance value of 0.1 while an inverse depth value between 1/20 and 1/50 may be associated with an inverse depth covariance value of 0.2. The mapping that associates inverse depth values with inverse depth covariance values may be generated by repeatedly estimating an inverse depth, at known distances from objects captured by the camera to calculate an accuracy of an estimate. The UE 602 may transmit the transmission 603 in response to the inverse depth covariance associated with the estimated inverse depth being less than or equal to a threshold value.

In some aspects, the UE 602 may associate a depth value with a depth covariance value. Similar to the inverse depth covariance value, the depth covariance value may have an inverse relationship with the accuracy of an estimate of a depth, where a larger depth covariance value indicates a lower accuracy of the estimate and a smaller depth covariance value indicates a greater accuracy of the estimate. The UE 602 may have a mapping that associates depth values with depth covariance values. For example, a depth value between 1 meter (m) and 20 m may be associated with a depth covariance value of 1 m while an inverse depth value between 20 m and 50 m may be associated with an inverse depth covariance value of 5 m. The mapping that associates depth values with depth covariance values may be generated by repeatedly estimating a depth, at known distances from objects captured by the camera to calculate an accuracy of an estimate. The UE 602 may calculate an estimated depth value based on the estimated inverse depth. The UE 602 may transmit the transmission 603 in response to the depth covariance associated with the estimated depth (based on the estimated inverse depth) being less than or equal to a threshold value. In some aspects, the transmission 603 may include the depth covariance, allowing a device receiving the transmission 603 to estimate the accuracy of the estimated depth or estimated inverse depth.

In one aspect, the UE 602 may be configured to transmit the transmission 603 having attributes of the image in response to a trigger event. In one aspect, the UE 602 may transmit the transmission 603 in response to the camera 601 capturing an image having a recognized traffic sign (e.g., a 2D projection that is associated with a historical reference traffic sign saved to memory). In another aspect, the UE 602 may transmit the transmission 603 in response to the camera 601 capturing an image that no longer has a 2D projection of a 3D object that was in a previous captured image. (i.e., the 3D object is no longer in view of the UE 602). In another aspect, the UE 602 may transmit the transmission 603 in response to one or more calculated or estimated dimensions converging (i.e., the diagonals of a covariance matrix fall within a margin of error, successive calculated values fall within a margin of error). The UE 602 may publish calculated/estimated traffic sign states/dimensions to other ADAS components of the UE 602 or over V2X or V2V links via transmission 603. The states/dimensions may be published along with diagonal entries of a corresponding covariance matrix.

The UE 602 may transmit a transmission 603 to the road side unit (RSU) 622 via a sidelink resource and/or the base station 624 via a cellular (e.g., a UE-UTRAN (Uu)) resource, such as an uplink or a downlink resource. The base station 624 may be configured to transmit a Uu transmission to the UE 602. The Uu communication may be based on a slot structure including aspects described in connection with FIGS. 2A-2D. The RSU 622 may be configured to transmit a sidelink transmission 623 to the UE 602. The sidelink communication may be based on a slot structure including aspects described in connection with FIG. 5. For example, the sidelink transmissions from the UE 602 or the RSU 622 may include a control channel (e.g., PSCCH) and/or a corresponding data channel (e.g., PSSCH). A control channel may include information (e.g., sidelink control information (SCI)) for decoding the data channel including reservation information, such as information about time and/or frequency resources that are reserved for the data channel transmission. For example, the SCI may indicate a number of TTIs, as well as the RBs that will be occupied by the data transmission. The SCI may also be used by receiving devices to avoid interference by refraining from transmitting on the reserved resources. The UE 602 and the RSU 622 may each be capable of sidelink transmission in addition to sidelink reception. The sidelink transmissions may be unicast, broadcast or multicast to nearby devices. The sidelink transmissions may include transmissions between V2V or V2X type applications, including map crowdsourcing. The UE 602 may include a dimension generator component 198 as described in connection with FIG. 1.

Sidelink communication may be based on different types or modes of resource allocation mechanisms. In a first resource allocation mode (which may be referred to herein as "Mode 1"), centralized resource allocation may be provided by a network entity. For example, a base station 624 may determine resources for sidelink communication and may allocate resources to the UE 602 and RSU 622 to use for sidelink transmissions. The base station 624 may provide the allocated sidelink resources as one or more Uu transmissions 625 (e.g., a downlink transmission).

In a second resource allocation mode (which may be referred to herein as "Mode 2"), distributed resource allocation may be provided. In Mode 2, the UE 602 may autonomously determine resources to use for sidelink transmission. In order to coordinate the selection of sidelink resources by the UE 602, the UE 602 may use a sensing technique to monitor for resource reservations by other sidelink UEs, such as UEs 104 in FIG. 1, and may select resources for sidelink transmissions from unreserved resources. Devices communicating based on sidelink, may determine one or more radio resources in the time and frequency domain that are used by other devices in order to select transmission resources that avoid collisions with other devices.

The sidelink transmission and/or the resource reservation may be periodic or aperiodic, where a UE may reserve resources for transmission in a current slot and up to two future slots (discussed below).

In the second mode (e.g., Mode 2), individual UEs may autonomously select resources for sidelink transmission, e.g., without a central entity such as a base station indicating the resources for the device. A first UE may reserve the selected resources in order to inform other UEs about the resources that the first UE intends to use for sidelink transmission(s).

In some examples, the resource selection for sidelink communication may be based on a sensing-based mechanism. For instance, before selecting a resource for a data transmission, a UE may first determine whether resources have been reserved by other UEs.

For example, as part of a sensing mechanism for resource allocation mode 2, the UE may determine (e.g., sense) whether the selected sidelink resource has been reserved by other UE(s) before selecting an sidelink resource for a data transmission. If the UE determines that the sidelink resource has not been reserved by other UEs, the UE may use the selected sidelink resource for transmitting the data, e.g., in a PSSCH transmission. The UE may estimate or determine which radio resources (e.g., sidelink resources) may be in-use and/or reserved by others by detecting and decoding sidelink control information (SCI) transmitted by other UEs. The UE may use a sensing-based resource selection algorithm to estimate or determine which radio resources are in-use and/or reserved by others. The UE may receive SCI from another UE that includes reservation information based on a resource reservation field included in the SCI. The UE may continuously monitor for (e.g., sense) and decode SCI from peer UEs. The SCI may include reservation information, e.g., indicating slots and RBs that a particular UE has selected for a future transmission. The UE may exclude resources that are used and/or reserved by other UEs from a set of candidate resources for sidelink transmission by the UE, and the UE may select/reserve resources for an sidelink transmission from the resources that are unused and therefore form the set of candidate resources. The UE may continuously perform sensing for SCI with resource reservations in order to maintain a set of candidate resources from which the UE may select one or more resources for an sidelink transmission. Once the UE selects a candidate resource, the UE may transmit SCI indicating its own reservation of the resource for an sidelink transmission. The number of resources (e.g., sub-channels per subframe) reserved by the UE may depend on the size of data to be transmitted by the UE. Although the example is described for a UE receiving reservations from another UE, the reservations may also be received from an RSU or other device communicating based on sidelink.

Images captured by the camera 601 may be analyzed by the UE 602 and may transmit attributes of 3D objects captured by the camera 601, for example to generate an accurate street map. In one aspect, a wireless device may estimate and transmit attributes of 3D objects about the vehicle by analyzing at least one image obtained from a camera. A non-linear least-squares solver may be used to estimate dimensions of an object in an image. A non-linear least-squares solver may include, for example, a Levenberg Marquardt solver, a Gauss Newton solver, an extended Kalman filter, an unscented Kalman filter or a particle filter. Each object in an image may be described using a plurality of dimensions estimated by such a non-linear least-squares solver.

Figure 7:
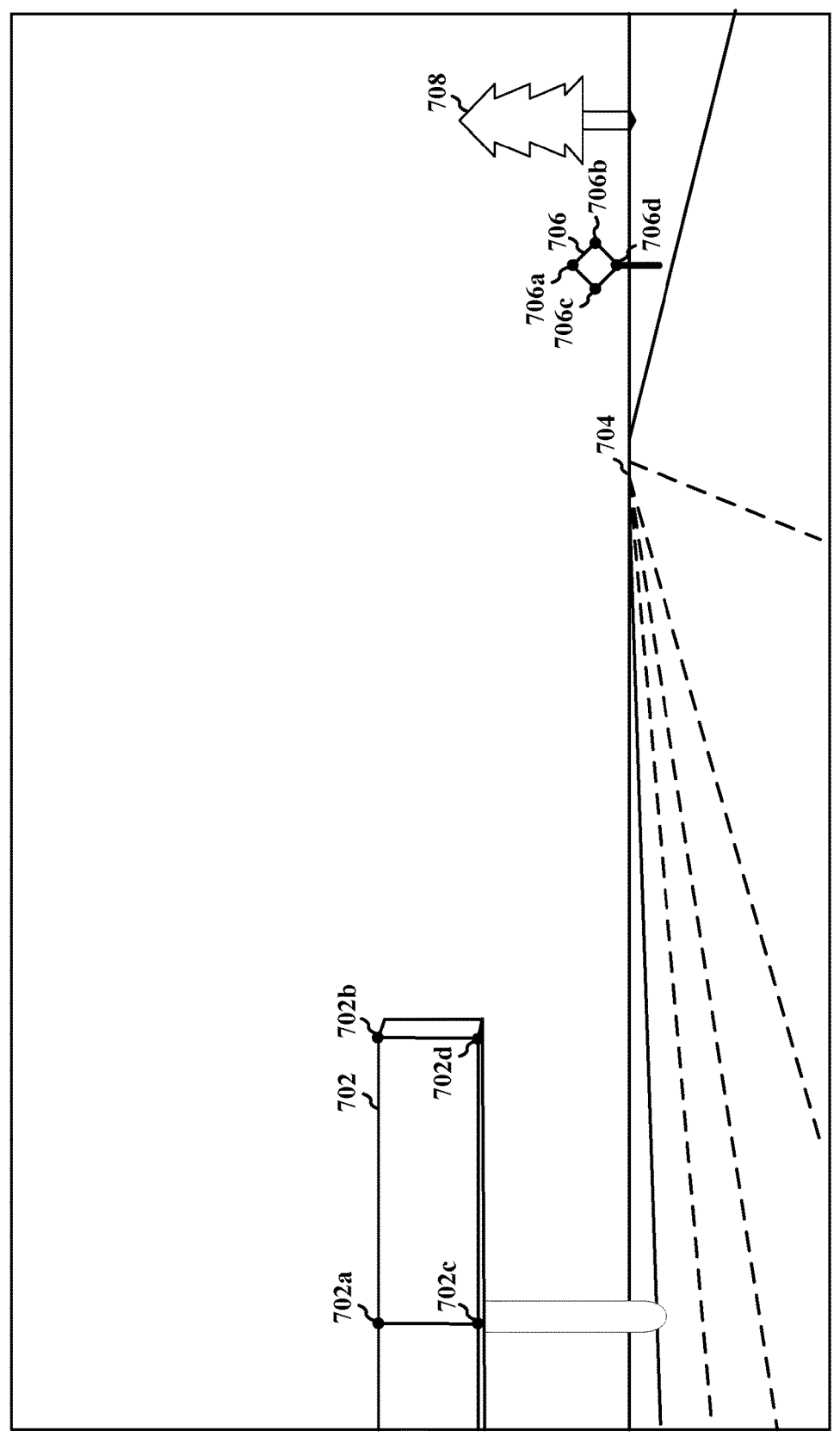
FIG. 7 shows an exemplary image taken by the camera of FIG. 6

FIG. 7 shows a 2D image 700 obtained from a camera. The 2D image 700 may have portions that include 2D projections of 3D objects, such as 2D projection 702 of a first traffic sign, 2D projection 704 of a road, 2D projection 706 of a second traffic sign, and 2D projection 708 of a tree. The 2D image 700 may be an image taken using the camera 601 in FIG. 6, where the 2D projection 702 may be a 2D projection of the first traffic sign 606, the 2D projection 704 may be a 2D projection of the road 608, the 2D projection 706 may be a 2D projection of the second traffic sign 610, and the 2D projection 708 may be a 2D projection of the tree 612. The 2D image 700 may be associated with a location, for example a location of a UE having a GNSS fix taken at the time the image was captured. The 2D image 700 may also be associated with an orientation of the camera used to capture the 2D image 700. The orientation may be described using three dimensions, such as pitch, roll, and yaw. Each of the 2D projections of signs, 2D projection 702 and 2D projection 706, may be described using eight dimensions of a non-linear least-squares solver.

2D projections of 3D objects may be analyzed by locating corner points of the 2D projection of the 3D object in the image. A device analyzing an image may identify the locations of corner points of 2D projection in any suitable manner, for example by identifying rectangular objects in an image, by identifying objects having colors that are similar to those used for known traffic signs, or by using a deep neural network to train an image analysis algorithm to recognize 2D projections of objects of interest. For example, a device analyzing the 2D image 700 may determine that the 2D projection 702 of a first traffic sign has the four corner points 702a, 702b, 702c, and 702d. Similarly, a device analyzing the 2D image 700 may also determine that the 2D projection 702 of a second traffic sign has the four corner points 706a, 706b, 706c, and 706d. The 2D projection 706 of a first traffic sign may be described using the four corner points 706a, 706b, 706c, and 706d of the 2D projection 706. The 2D projection 706 may be described as a rotated rectangle in the 2D image 700. Such a device may use a perception engine to detect 2D pixels on the 2D image 700 corresponding to traffic sign corners.

Each corner point may be described in any suitable manner to identify a location along the surface of the 2D image where the corner point is located. In one aspect, a device analyzing the 2D image 700 may determine each corner point as a pixel of the 2D image 700 of an x-y axis graph having an x-axis and a y-axis defined by the resolution of the 2D image 700 where the top left-hand corner point (corner point 702a for 2D projection 702) may be designated as (0,0). In another aspect, a device analyzing the 2D image 700 may calibrate a camera to determine the camera calibration matrix and the camera distortion parameters, allowing such points to be processed to be expressed in terms of ideal camera coordinates rather than in terms of image pixels or device pixels.

A rectangular 3D object, such as a traffic sign, may be modeled as a general rectangle with an arbitrary orientation and eight degrees of freedom (i.e., eight dimensions). Two of the eight dimensions may represent the rectangular 3D object's size, such as height and width. Three of the eight dimensions may represent the rectangular 3D object's position, such as the distance forward/back, the distance left/right, and the distance up/down relative to a direction of the camera, such as the direction a vehicle is facing. The position may be reported relative to a location, such as the location of a vehicle that captures an image. An object's position described in an image may be described as having a distance forward/back that is positive, as a camera may not capture an image of an object located behind the lens of the camera. Three of the eight dimensions may represent the rectangular 3D object's orientation, such as pitch, roll, and yaw. The eight dimensions may be used in a non-linear least-squares solver to represent a rectangular traffic sign in an image.

The variables p, q, and r may be used as reference frames.

$$t_{qr}^p \in \mathbb{R}^3$$

may represent a translation from a q frame to an r frame expressed in p frame coordinates where $$t_{qr} \triangleq t_{qr}^q.$$

Let $R_{qr} \in \mathbb{R}^{3 \times 3}$ represent the rotation of the 3D object from q frame to r frame. Thus, the formula $$t_{qr} = t_{qp} + t_{pr}^q = t_{qp} + R_{qp}t_{pr}$$

may be used to relate translations in different reference frames.

In one aspect, a rectangular 3D object may be described using a reference frame f fixed to the top left-hand corner of the object, oriented such that the rectangle lies in the x-y plane of the frame with the x-direction being right, the y-direction being down, and the z-direction being the rectangle normal. Using such a frame f, the size $a_f$ of the rectangular 3D object relative to the frame may be defined by a width of $a_f(0)$ measured in the x-direction of f, and a height of $a_f(1)$ measured in the y-direction of f. In other words, the stacked $a_f(0)$ and $a_f(1)$ may form the vector $a_f \in \mathbb{R}^2$. A rectangular 3D object may be described with respect to a camera frame c by the tuple $(t_{cf}, R_{cf}, a_f)$. Let $t \in \mathbb{R}^3$ represent a point in three dimensions. For example, $t(0)$ may represent the distance of the 3D object from the camera in an x-direction (e.g., to the right), $t(1)$ may represent the distance of the 3D object from the camera in a y-direction (e.g., upwards), and $t(2)$ may represent the distance of the 3D object from the camera in a z-direction (e.g., forwards).

Estimating the values for $R_{cf}$ of a rectangular 3D object facing a camera may be simpler for rectangular 2D projection, as such 3D objects may be assumed to have a neutral orientation. Determining the values for $t_{cf}$ and $a_f$ for a 3D object in a 2D image, such as the 2D image 700 in FIG. 7, may be difficult, as such values may not be directly observable using a single 2D image from a camera. For example, the z value of $t_{cf}$ (the depth) of the 3D object may not be known since the distance of the 3D object from the camera may not be known from a single 2D projection of a 3D object. The values for $a_f$ of the 3D object may not be known since measuring the length and height of a 2D projection may not be representative of the length and height of the 3D object without knowing an appropriate scale multiplier for the measured object.

In some aspects, the eight dimensions of size, position, and orientation of a 2D projection of a rectangular traffic sign in a 2D image may be estimated by tracking a traffic sign from many positions from where the image was captured by the camera. However, tracking a 3D object from many positions from where an image is captured may delay initialization of the non-linear least-squares solver. The delayed initialization may be cumbersome from an implementation point of view. In some aspects, tracking a 3D object from many positions may use a separate tracking mechanism, which may further complicate and delay initialization of the non-linear least-squares solver. Such a delay may be problematic if a traffic sign is first observed at a short distance by a vehicle (e.g., due to blocked visibility), and the vehicle must perform one or more control actions that move the vehicle from a designated route to track the traffic sign sufficiently to describe the eight dimensions of size, position, and orientation.

Moreover, transmitting a description of a 3D object using a non-linear least-squares solver having eight dimensions may mean transmitting an estimated mean and covariance information of the non-linear least-squares solver. The covariance matrix of a non-linear least-squares solver having eight dimensions may be an 8×8 matrix, which may have 64 scalar entries. Transmitting all 64 scalar entries may utilize significant wireless resources. While transmission of the 64 scalar entries may be reduced to 36 entries using the symmetry of a covariance matrix of an extended Kalman filter, transmitting all 36 unique scalar covariance values may also use significant bandwidth specifications.

In one aspect, the 2D projection of 3D object on a 2D image may be described using a depth-normalized position ($\tau$), a depth-normalized size ($\alpha$), and an orientation ($R_{cf}$).

The depth-normalized position $\tau$ may be an inverse-depth parameterization of the points $t \in \mathbb{R}^3$ in three dimensions.

For example, $$\tau = \begin{pmatrix} t(0)/t(2) \\ t(1)/t(2) \\ 1/t(2) \end{pmatrix}.$$

In other words, t to $\tau$ may be understood as a one-to-one mapping, except for the case of $t(2)=0$, where the inverse-depth parameterization is undefined. However, such situations may be rare as a 3D object captured by a camera should be at least some distance in front of the lens of the camera. The mapping from t to $\tau$ may be an involution (i.e., the inverse mapping may be equal to the mapping itself)

Likewise, the depth-normalized size $\alpha$ may be an inverse-depth parameterization of the points $a \in \mathbb{R}^2$ in two dimensions that may represent a size of a rectangular object.

For example, $\alpha = a/t(2)$.

Again, a to $\alpha$ may be understood to be a one-to-one mapping except for the case of $t(2)=0$, where the inverse-depth parameterization is undefined.

Thus, the tuple $(t_{cf}, R_{cf}, a_f)$ may be reparametrized as $(\tau_{cf}, R_{cf}, \alpha_f)$. While the tuple $(t_{cf}, R_{cf}, a_f)$ may have at least three out of eight dimensions that are not observable when analyzing a 2D projection of a 3D image (e.g., $a_f(0)$, $a_f(1)$, and $t_{cf}(2)$), the tuple $(\tau_{cf}, R_{cf}, \tau_f)$ may have one out of eight dimensions that is unobservable when analyzing a 2D projection of a 3D image by using estimated calculations with a high degree of accuracy.

The locations of the corner points of a rectangular object may be defined using $t_{ff_{ij}} \triangleq B_{ij}a_f$ for $i,j \in \{0,1\}$ and $$B_{ij} \triangleq \begin{pmatrix} i & 0 \\ 0 & j \\ 0 & 0 \end{pmatrix},$$

$t_{ff_{00}}=0$ since $f_{00}=f$ by definition.

The measurements of distances between such corner points may be labeled as $\gamma_{ij} \in \mathbb{R}^2$ for $i,j \in \{0,1\}$. The measurements may be modeled as $\gamma_{ij} \triangleq \tau_{cf_{ij}}(0:1)+z_{ij}$.

Here, $\tau_{cf_{ij}} \in \mathbb{R}^2$ may be the depth normalized translation of the point $f_{ij}$ with respect to c frame given by $\tau_{cf_{ij}}(0:1)=t_{cf_{ij}}(0:1)/t_{cf_{ij}}(2)$.

Here, $z_{ij} \in \mathbb{R}^2$ may be additive measurement noise. $z_{ij}$ may be Gaussian with a mean of zero and a covariance matrix of $\Sigma \in \mathbb{R}^{2 \times 2}$. The noise terms $z_{ij}$ may be independent across $i,j \in \{0,1\}$. In some aspects, $\Sigma$ may not be diagonal since the measurements may be expressed in ideal camera coordinates and may include the correlating effects of undistorting the raw image coordinates.

The measurements $\gamma_{ij} \in \mathbb{R}^2$ for $i$, $j \in \{0,1\}$ of a single rectangular 2D projection, such as the 2D projection 702 or the 2D projection 706, may be used to calculate, with a high degree of accuracy, seven out of the eight dimensions of the tuple $(\tau_{cf}, R_{cf}, \alpha_f)$. The depth-normalized position values of $\tau\tau_{cf}(0:1)$, may be directly calculated with a high degree of accuracy using $\gamma_{00}$. In other words, $\hat{\tau}_{cf}(0:1) \triangleq \gamma_{00}$.

A maximum likelihood estimate for a traffic sign state given measurements from an initial camera frame may be $$\arg \min_{\hat{\tau}_{cf}(0:1), R_{cf}, \hat{\alpha}_{cf}} \sum_{ij} \hat{z}_{ij}^T \sum{}^{-1} \hat{z}_{ij}.$$

The aforementioned optimization problem may not solve for the unobservable quantity $\tau_{cf}(2)$.

Here, $\hat{z}_{ij}$ may be expressed in terms of $\hat{\tau}_{cf}(0{:}1)$, $\hat{R}_{cf}$, $\hat{\alpha}_{cf}$ by calculating as follows:

$$\tau_{cf_{ij}}(0{:}1) = \frac{t_{cf_{ij}}(0{:}1)}{t_{cf_{ij}}(2)},$$

$$= \frac{t_{cf}(0{:}1) + (R_{cf}t_{ff_{ij}})(0{:}1)}{t_{cf}(2) + (R_{cf}t_{ff_{ij}})(2)},$$

$$= \frac{t_{cf}(0{:}1) + (R_{cf}B_{ij}a_f)(0{:}1)}{t_{cf}(2) + (R_{cf}B_{ij}a_f)(2)}.$$

Dividing the numerator and denominator by $\tau_{cf}(2)$ may yield:

$$\tau_{cf_{ij}}(0{:}1) = \frac{\tau_{cf}(0{:}1) + (R_{cf}B_{ij}\alpha_{cf})(0{:}1)}{1 + (R_{cf}B_{ij}\alpha_{cf})(2)}.$$

Therefore, $\hat{\tau}_{cf_{ij}}(0{:}1)$ may be calculated with a high degree of accuracy as $$\hat{\tau}_{cf_{ij}}(0{:}1) = \frac{\hat{\tau}_{cf}(0{:}1) + (\hat{R}_{cf}B_{ij}\hat{\alpha}_{cf})(0{:}1)}{1 + (\hat{R}_{cf}B_{ij}\hat{\alpha}_{cf})(2)}.$$

Thus, $$\hat{z}_{ij} = y_{ij} - \frac{\hat{\tau}_{cf}(0{:}1) + (\hat{R}_{cf}B_{ij}\hat{\alpha}_{cf})(0{:}1)}{1 + (\hat{R}_{cf}B_{ij}\hat{\alpha}_{cf})(2)}.$$

Applying $\hat{z}_{ij}$ to the optimization problem $$\arg\min_{\hat{\tau}_{cf}(0:1),R_{cf},\hat{\alpha}_{cf}} \sum_{ij} \hat{z}_{ij}^T \Sigma^{-1} \hat{z}_{ij}$$

may allow the optimization problem to be solved numerically by using nonlinear least squares solvers, such as a Levenberg Marquardt solver, or a Gauss Newton solver, an extended Kalman filter, an unscented Kalman filter or a particle filter. Such solvers may be iterative in nature and may need a reasonable value, such as one of the reasonable estimates provided below, to start.

The orientation $\hat{R}_{cf}$ may be calculated, with a high degree of accuracy, based on the vanishing points of the 2D projection computed using the measurements $\gamma_{00}$, $\gamma_{01}$, $\gamma_{10}$ and $\gamma_{11}$. Using the homogeneous versions $\gamma_{ij} \in \mathbb{P}^2$ of the measurements $\gamma_{ij} \in \mathbb{R}^2$, the vanishing points $v_x$ and $v_\gamma$ may be constructed.

$v_x \triangleq (y_{00} \times y_{10}) \times (y_{01} \times y_{11})$, corresponding to the x-axis of the f frame.

$v_y \triangleq (y_{00} \times y_{01}) \times (y_{10} \times y_{11})$, corresponding to the y-axis of the f frame.

These noisy vanishing points may be used to directly estimate the first two columns of $R_{cf}$. For example, $$\tilde{R}_{cf} \triangleq \left( \frac{v_x}{\|v_x\|} \quad \frac{v_y}{\|v_y\|} \quad \frac{v_x \times v_y}{\|v_x \times v_y\|} \right)$$

Because of the impact of noise, the matrix $\tilde{R}_{cf}$ may not be a rotation matrix. A calculation of $\hat{R}_{cf}$ with a high degree of accuracy may be chosen as a closest rotation matrix to $\tilde{R}_{cf}$ in [0123] with respect to Frobenius norm. For example, $$\hat{R}_{cf} \triangleq \frac{1}{\det(\tilde{U}\tilde{V}^T)} \tilde{U}\tilde{V}^T,$$

where $\tilde{U}\tilde{D}\tilde{V}^T$ may be the singular value decomposition of $\tilde{R}_{cf}$. The depth-normalized size $\alpha_{cf}$ may be calculated using the differences $\gamma_{10} - \gamma_{00}$ and $\gamma_{01} - \gamma_{00}$.

For example, define $\rho_i \triangleq R_{cf}e_i$ for $i \in \{0,1\}$. Here, $e_0$ may be the first column of a 3×3 identity matrix and $e_1$ may be the second column of the a 3×3 identity matrix.

$$\tau_{cf_{10}}(0{:}1) = \frac{t_{cf_{10}}(0{:}1)}{t_{cf_{10}}(2)},$$

$$= \frac{t_{cf}(0{:}1) + a_f(0)\rho_0(0{:}1)}{t_{cf}(2) + a_f(0)\rho_0(2)},$$

$$= \frac{\tau_{cf}(0{:}1) + \alpha_{cf}(0)\rho_0(0{:}1)}{1 + \alpha_{cf}(0)\rho_0(2)}.$$

Since the relation involving the depth-normalized traffic size $\alpha_{cf}$ may be a 2D vector equality, pre-multiplying both sides by a fixed vector $u_0^T$ may provide:

$$u_0^T \tau_{cf_{10}}(0{:}1) = \frac{u_0^T \tau_{cf}(0{:}1) + \alpha_{cf}(0)u_0^T \rho_0(0{:}1)}{1 + \alpha_{cf}(0)\rho_0(2)}$$

Solving for $\alpha_{cf}(0)$ provides:

$$\alpha_{cf}(0) = \frac{u_0^T(\tau_{cf}(0{:}1) - \tau_{cf_{10}}(0{:}1))}{u_0^T(\rho_0(2)\tau_{cf_{10}}(0{:}1) - \rho_0(0{:}1))}.$$

Thus, $u_0 \triangleq \rho_0(2)\tau_{cf_{10}}(0{:}1) - \rho_0(0{:}1)$ may be a reasonable calculation.

Similarly, solving for $\alpha_{cf}(1)$ provides:

$$\alpha_{cf}(1) = \frac{u_1^T(\tau_{cf}(0{:}1) - \tau_{cf_{01}}(0{:}1))}{u_1^T(\rho_1(2)\tau_{cf_{01}}(0{:}1) - \rho_1(0{:}1))}$$

Thus, $u_1 \triangleq \Sigma_1(2)\tau_{cc_{01}}(0{:}1) - \rho_1(0{:}1)$ may be a reasonable calculation.

Therefore, $$\hat{\alpha}_{cf}(0) \triangleq \frac{\hat{u}_0^T(y_{00} - y_{10})}{\|(\hat{\rho}_0(2)y_{10} - \hat{\rho}_0(0{:}1))\|^2} \quad \text{where}$$

$\hat{\rho}_i \triangleq \hat{R}_{cf}e_i$, and $\hat{u}_0 \triangleq \rho_0(2)\gamma_{10} - \hat{\rho}_0(0{:}1)$.

Similarly, $$\hat{\alpha}_{cf}(1) \triangleq \frac{\hat{u}_1^T(y_{00} - y_{01})}{\|(\hat{\rho}_1(2)y_{01} - \hat{\rho}_1(0:1))\|^2} \text{ where}$$

$$\hat{u}_1 \triangleq \hat{\rho}_1(2)\gamma_{01} - \gamma_{01} - \hat{\rho}_1(0:1)$$

Using the above calculations, reasonable, initial estimates for $\hat{\tau}_{cf}(0:1)$, $\hat{R}_{cf}$, $\hat{\alpha}_{cf}$ may be calculated, and used as a starting point for an iterative solver of the least-squares optimization problem $$\arg\min_{\hat{\tau}_{cf}(0:1), \hat{R}_{cg}, \hat{\alpha}_{cf}} \sum_{ij} \hat{z}_{ij}^T \sum^{-1} \hat{z}_{ij}.$$

The solution to such an optimization problem may provide a refined estimate of $\hat{\tau}_{cf}(0:1)$, $\hat{R}_{cf}$, $\hat{\alpha}_{cf}$.

Thus, each of the dimensions of the tuple ($\tau_{cf}$, $R_{cf}$, $\alpha_f$), except for $\tau_{cf}(2)$, may be calculated based on a single 2D image, such as the 2D image 700 in FIG. 7. The calculated values of the seven dimensions may be used to initialize a non-linear least-squares solver, such as a Levenberg Marquardt solver, a Gauss Newton solver, an extended Kalman filter, an unscented Kalman filter or a particle filter.

The inverse depth $\tau_{cf}(2)$ may not be calculated with a high degree of accuracy using a single rectangular 2D projection. This parameter may be calculated with a high degree of accuracy through motion. For example, the inverse depth $\tau_{cf}(2)$ may be calculated with a high degree of accuracy by analyzing a series of images, where at least two of the images contain a 2D projection of the same 3D object from two different locations, where the location of where each image was taken is known. However, the inverse depth parameter $\tau_{cf}(2)$ may be initialized with a reasonable estimate, such as $\frac{1}{20}\text{m}^{-1}$ (an estimate of 20 m from the camera). As a result, a non-linear least-squares solver (e.g., an extended Kalman filter) initialized using a reasonable estimate of $\frac{1}{20}\text{m}^{-1}$ may have a prior that covers the interval from 0 m$^{-1}$ to $\frac{1}{20}\text{m}^{-1}$.

Expressed in a non-inverse depth, this prior interval may be considered 20 m to $\infty$m. In other words, the initial uncertainty may be large enough to model a diffuse prior able to estimate depths all the way to infinity, while also excluding negative depths from the interval.

A device may provide a reasonable estimate of the inverse depth $\tau_{cf}(2)$ based on information associated with one or more properties of the camera, such as the camera 601 in FIG. 6, or one or more properties a reference object associated with the at least one captured object, such as the first traffic sign 606 in FIG. 6. For example, a resolution of the camera may provide a number of pixels high and wide of the 2D image 700. The number of pixels for the resolution of the camera may allow a device that counts a number of pixels between corner points of a traffic sign to estimate the distance better, when correlated with other information, such as a location of the UE, or historical measurements of objects similar to the 2D projection of the captured object. Historical measurements of objects similar to the 2D projection of the captured object may be used to provide additional context. In one example, a first image captured by a first camera having a first resolution may capture a 2D representation of a first sign with known height and width dimensions from a known distance. The 2D representation may have a first height dimension and a first width dimension. A second image captured by a second camera having the same resolution of the first camera may have a 2D representation of a second sign with the same height dimension and same width dimension of the sign in the first image. The second sign may have the same height and width dimensions as the first sign. The UE may estimate the distance to the second sign to be the same as the distance the first camera was from the first sign when the first image was captured. In another example, a traffic sign may be recognized by text on the sign, or a color of the sign, as certain signs may be authorized to have certain background colors. The color of the sign may be used to determine the actual size dimensions of the sign, which may not provide a more accurate height and width to use for the $\alpha_f$ values, but also may provide context on other distance measurements.

In one aspect, a traffic sign may have historically been captured by a camera having a resolution of 1920×1180 with dimensions of 400 pixels by 200 pixels at 40 m away. A 2D projection of a traffic sign with the same background color may also have dimensions of 400 by 200 pixels in an image with a resolution of 1920×1180. As a result, a device analyzing the 2D projection may provide an initial inverse depth estimate of $\tau_{cf}(2) = \frac{1}{40}\text{m}^{-1}$. In another aspect, a traffic sign may have been historically captured by a type of camera having a 2D projection of a traffic sign with dimensions of 250 pixels by 250 pixels at 15 m away. A device analyzing a 2D projection of a traffic sign having the same dimensions captured by the same type of camera by determining the object in the 2D projection may provide an initial inverse depth estimate of $\tau_{cf}(2) = \frac{1}{20}\text{m}^{-1}$. One or more properties of reference objects and/or one or more properties of cameras may be saved in a memory accessible to the device. The device may be configured to reference such properties to provide a reasonable estimate of the inverse depth $\tau_{cf}(2)$ to initialize a non-linear least-squares solver.

In another aspect, reference objects, such as traffic signs, may have a size property, a shape property, and a location in an image property associated with each reference object. For example, where the reference objects include traffic signs, the reference objects may include diamond-shaped roadside signs (categorized by diamond-shaped signs captured to a side of a road), overhead signs (categorized by rectangular-shaped signs captured above a road), and rectangular speed limit signs (categorized by rectangular signs captured to a side of a road). Each sign may be recognized by shared properties with a 2D projection, and may be associated with a size. For example, diamond-shaped road signs may be 3 ft.×3 ft., and overhead signs may be 10 ft.×5 ft. A perception engine may be used to associate a 2D projection with a type of sign (e.g., by using corner points to detect a shape and a location of the 2D projection), which may be referenced as a reference object to derive a size of the 3D object (i.e., $\alpha_f$). A reference object may be associated with a region. For example, a device may compare 2D projections to reference objects associated with a first region when the location that the image was taken is determined to be within the first region, and may compare 2D projections to reference objects associated with a second region when the location that the image was taken is determined to be within the second region. Once a size of the 3D object is known, the analyzing device may determine a depth normalized size (i.e., $\alpha_f$) by comparing pixel distances of corner points against a known size of the 3D object based on properties of the reference object. A device applying the $\alpha_f = \alpha_f / t_{cf}(2)$ equation to these values may solve for $t_{cf}(2)$ to determine the depth of the 3D object, which may then be used to derive a reasonable estimate for the inverse depth $\tau_{cf}(2)$.

This reasonable estimate $\hat{\tau}_{cf}(2)$ may be used together with the refined estimate of $\hat{\tau}_{cf}(0:1)$, $\hat{R}_{cf}$, $\hat{\alpha}_{cf}$ to initialize a Kalman filter state with a diffuse initialization of the inverse depth $\hat{\tau}_{cf}(2)$ and provide reasonable initialization values for $\hat{\tau}_{cf}$, $\hat{R}_{cf}$, $\hat{\alpha}_{cf}$.

In one aspect, an association module of the device may be configured to first attempt to associate measurements (e.g., measurements between corner points) with an existing traffic sign state of an extended Kalman filter saved on a memory. If the association module fails, the module may then declare that a new traffic sign state is to be added, or may declare that the association failed.

A device calculating dimensions of a 2D projection of a 3D object captured in a 2D image may use the tuple $(\tau_{cf}, R_{cf}, \alpha_f)$ to calculate seven out of the eight dimensions with a high degree of accuracy and may estimate the eighth dimension with a lossy, diffuse lower degree of accuracy. The lower degree of accuracy may be improved by analyzing at least one additional 2D image having a 2D projection of the same 3D object to calculate a more accurate inverse depth $\tau_{cf}(2)$ based on the distance between where the images were captured and a distance between corner points of the 2D projections.

Calculating seven out of the eight dimensions of the tuple $(\tau_{cf}, R_{cf}, \alpha_f)$ with a high degree of accuracy and estimating the eighth dimension allows an analyzing device to initialize a non-linear least-squares solver without delay. Such a calculation also separates the seven instantaneously observable dimensions from the non-instantaneously observable depth dimension.

A device calculating the dimensions of the tuple $(\tau_{cf}, R_{cf}, \alpha_f)$ representing a 3D object may be configured to transmit an entire covariance matrix of a non-linear least-squares solver (e.g., a joint covariance $\Sigma \in \mathbb{R}^{8 \times 8}$), or may be configured to transmit the diagonal elements of the covariance matrix, or a function of the diagonal elements of the covariance matrix (e.g., a square root of the diagonal elements to compute the standard deviation instead of the variance). For example, the device may be configured to transmit the eight scalar diagonal elements of a covariance matrix of an extended Kalman filter. The receiving device may then assume that the off-diagonal elements are zero. This reduces the number of scalar values to be sent from 36 to 8. Since most of the uncertainty for the tuple $(\tau_{cf}, R_{cf}, \alpha_f)$ is limited to the inverse depth $\tau_{cf}(2)$, the errors of the extended Kalman filter will likely be highly correlated in a single dimension (i.e., the inverse depth dimension, or $\delta\tau_{cf}(2)$). As a result, the diagonal approximation for the covariance matrix may be a faithful representation of the covariance matrix. This error covariance may be used by downstream components, such as a map crowdsourcing application, to better fuse information from a plurality of such device.

FIG. 8 is a flowchart 800 of a method of wireless communication. The method may be performed by a wireless device, a component of a wireless device, a UE, or a component of a UE (e.g., the UE 104, the UE 350, the UE 404, the UE 602; the apparatus 1104). The methods described herein may provide a number of benefits, such as improving resource utilization and/or power savings.

At 802, the UE may obtain, from a camera, an image with at least one captured object. The at least one captured object may include a plurality of dimensions and where the image includes a 2D projection of the at least one captured object. For example, 802 may be performed by the UE 602 in FIG.

6, which may obtain, from the camera 601, an image, such as the 2D image 700 in FIG. 7. The at least one captured object, such as the first traffic sign 606 or the second traffic sign 610, may have a plurality of dimensions, such as a depth-normalized position, a depth-normalized size, and an orientation. The image, such as the 2D image 700 in FIG. 7, may include a 2D projection 702 of the 3D object of the first traffic sign 606 in FIG. 6. Further, 802 may be performed by the component 198 in FIG. 11.

At 804, the UE may calculate at least one dimension of the plurality of dimensions of the at least one captured object based on the 2D projection of the at least one captured object. For example, 804 may be performed by the UE 602 in FIG. 6, which may calculate seven dimensions of the tuple $(\tau_{cf}, R_{cf}, \alpha_f)$ representing the first traffic sign 606 based on the 2D projection 702 in FIG. 7. The seven dimensions may include two dimensions of the three-dimensions of $\tau_{cf}$, such as the two dimensions $\tau_{cf}(0:1)$, and may include the three dimensions that represent $R_{cf}$ (e.g., Rodrigues angles or Euler angles), and may include the two dimensions of $\alpha_f$. Further, 804 may be performed by the component 198 in FIG. 11.

At 806, the UE may estimate an inverse depth of the plurality of dimensions of the at least one captured object based on information associated with one or more properties of the camera or one or more properties of at least one reference object associated with the at least one captured object. For example, 806 may be performed by the UE 602 in FIG. 6, which may estimate an inverse depth $\tau_{cf}(2)$ of the tuple $(\tau_{cf}, R_{cf}, \alpha_f)$, which may represent the first traffic sign 606 based on the 2D projection 702 in FIG. 7. The estimate may be based on the resolution of the camera and/or may be based on the dimensions of a traffic sign associated with the first traffic sign 606. Further, 806 may be performed by the component 198 in FIG. 11.

Finally, at 808, the UE may transmit an indication of the plurality of dimensions of the at least one captured object including the calculated at least one dimension and the estimated inverse depth. For example, 808 may be performed by the UE 602 in FIG. 6, which may transmit, via transmission 603, an indication of the calculated dimensions of the tuple $(\tau_{cf}, R_{cf}, \alpha_f)$ including the calculated two dimensions of such as $\tau_{cf}(0:1)$, the three dimensions of $R_{cf}$ and the two dimensions of $\alpha_f$, and the estimated inverse depth $\tau_{cf}(2)$ of the tuple $(\tau_{cf}, R_{cf}, \alpha_f)$. Further, 808 may be performed by the component 198 in FIG. 11.

FIG. 9 is a flowchart 900 of a method of wireless communication. The method may be performed by a wireless device, a component of a wireless device, a UE, or a component of a UE (e.g., the UE 104, the UE 350, the UE 404, the UE 602; the apparatus 1104). The methods described herein may provide a number of benefits, such as improving resource utilization and/or power savings.

At 902, the UE may obtain, from a camera, an image with at least one captured object. The at least one captured object may include a plurality of dimensions and where the image includes a 2D projection of the at least one captured object. For example, 902 may be performed by the UE 602 in FIG. 6, which may obtain, from the camera 601, an image, such as the 2D image 700 in FIG. 7. The at least one captured object, such as the first traffic sign 606 or the second traffic sign 610, may have a plurality of dimensions, such as a depth-normalized position, a depth-normalized size, and an orientation. The image, such as the 2D image 700 in FIG. 7, may include a 2D projection 702 of the 3D object of the first traffic sign 606 in FIG. 6. Further, 902 may be performed by the component 198 in FIG. 11.

At 904, the UE may calculate at least one dimension of the plurality of dimensions of the at least one captured object based on the 2D projection of the at least one captured object. For example, 904 may be performed by the UE 602 in FIG. 6, which may calculate seven dimensions of the tuple $(\tau_{cf}, R_{cf}, \alpha_f)$ representing the first traffic sign 606 based on the 2D projection 702 in FIG. 7. The seven dimensions may include two dimensions of the three-dimensions of $\tau_{cf}$, such as the two dimensions $\tau_{cf}(0:1)$, and may include the three dimensions that represent $\tau_{cf}$ (e.g., Rodrigues angles or Euler angles), and may include the two dimensions of $\alpha_f$. Further, 904 may be performed by the component 198 in FIG. 11.

At 906, the UE may estimate an inverse depth of the plurality of dimensions of the at least one captured object based on information associated with one or more properties of the camera or one or more properties of at least one reference object associated with the at least one captured object. For example, 906 may be performed by the UE 602 in FIG. 6, which may estimate an inverse depth $\tau_{cf}(2)$ of the tuple $(\tau_{cf}, R_{cf}, \alpha_f)$, which may represent the first traffic sign 606 based on the 2D projection 702 in FIG. 7. The estimate may be based on the resolution of the camera and/or may be based on the dimensions of a traffic sign associated with the first traffic sign 606. Further, 906 may be performed by the component 198 in FIG. 11.

At 908, the UE may transmit an indication of the plurality of dimensions of the at least one captured object including the calculated at least one dimension and the estimated inverse depth. For example, 908 may be performed by the UE 602 in FIG. 6, which may transmit, via transmission 603, an indication of the calculated dimensions of the tuple $(\tau_{cf}, R_{cf}, \alpha_f)$ including the calculated two dimensions of such as $\tau_{cf}(0:1)$, the three dimensions of $R_{cf}$ and the two dimensions of $\alpha_f$, and the estimated inverse depth $\tau_{cf}(2)$ of the tuple $\tau_{cf}, R_{cf}, \alpha_f)$. Further, 908 may be performed by the component 198 in FIG. 11.

At 910, the UE may associate the plurality of corner points with a non-linear least-squares solver. For example, 910 may be performed by the UE 602 in FIG. 6, which may associate the plurality of corner points, such as the four corner points 702a, 702b, 702c, and 702d, with a non-linear least-squares solver, such as a Levenberg Marquardt solver, a Gauss Newton solver, an extended Kalman filter, an unscented Kalman filter or a particle filter. Further, 910 may be performed by the component 198 in FIG. 11.

At 912, the UE may estimate the at least one dimension based on the non-linear least-squares solver. For example, 912 may be performed by the UE 602 in FIG. 6, which may estimate the at least one dimension, such as a height or a width of a traffic sign, using the non-linear least-squares solver. Further, 912 may be performed by the component 198 in FIG. 11.

At 914, the UE may calculate the at least one dimension of the plurality of dimensions based on the 2D projection of the at least one captured object. For example, 914 may be performed by the UE 602 in FIG. 6, which may calculate the at least one dimension, such as a height or a width of a traffic sign, of the plurality of dimensions based on the 2D projection, such as the 2D projection 702 in FIG. 7, of the at least one captured object, such as the first traffic sign 606. Further, 914 may be performed by the component 198 in FIG. 11.

At 916, the UE may calculate at least two dimensions of three dimensions of a depth-normalized position based on the 2D projection of the at least one captured object. The plurality of dimensions may include the depth-normalized position. The depth-normalized position may include the three dimensions of the plurality of dimensions. One of the three dimensions may include the inverse depth. For example, 916 may be performed by the UE 602 in FIG. 6, which may calculate at least two dimensions of three dimensions of a depth-normalized position, such as the two dimensions $\tau_{cf}(0:1)$, based on the 2D projection of the at least one captured object. The plurality of dimensions may include the depth-normalized position, such as $\tau_{cf}$. The depth-normalized position may include the three dimensions of the plurality of dimensions, denoted as $\tau_{cf}(0:1:2)$. One of the three dimensions may include the inverse depth, such as $\tau_{cf}(2)$. Further, 916 may be performed by the component 198 in FIG. 11.

At 918, the UE may calculate three dimensions of an orientation based on the 2D projection of the at least one captured object. The plurality of dimensions may include the orientation. The orientation may include the three dimensions of the plurality of dimensions. For example, 918 may be performed by the UE 602 in FIG. 6, which may calculate three dimensions of an orientation, such as $R_{cf}$ based on the 2D projection of the at least one captured object. The plurality of dimensions may include the orientation. The orientation may include the three dimensions of the plurality of dimensions, denoted as $R_{cf}(0:1:2)$. Further, 918 may be performed by the component 198 in FIG. 11.

At 920, the UE may calculate two dimensions of a depth-normalized size based on the 2D projection of the at least one captured object. The plurality of dimensions may include the depth-normalized size. The depth-normalized size may include the two dimensions of the plurality of dimensions. For example, 920 may be performed by the UE 602 in FIG. 6, which may calculate two dimensions of a depth-normalized size, such as $\alpha_f$, based on the 2D projection of the at least one captured object. The plurality of dimensions may include the depth-normalized size. The depth-normalized size may include the two dimensions of the plurality of dimensions, denoted as $\alpha_f(0:1)$. Further, 920 may be performed by the component 198 in FIG. 11.

FIG. 10 is a flowchart 1000 of a method of wireless communication. The method may be performed by a wireless device, a component of a wireless device, a UE, or a component of a UE (e.g., the UE 104, the UE 350, the UE 404, the UE 602; the apparatus 1104). The methods described herein may provide a number of benefits, such as improving resource utilization and/or power savings.

At 1002, the UE may obtain, from a camera, an image with at least one captured object. The at least one captured object may include a plurality of dimensions and where the image includes a 2D projection of the at least one captured object. For example, 1002 may be performed by the UE 602 in FIG. 6, which may obtain, from the camera 601, an image, such as the 2D image 700 in FIG. 7. The at least one captured object, such as the first traffic sign 606 or the second traffic sign 610, may have a plurality of dimensions, such as a depth-normalized position, a depth-normalized size, and an orientation. The image, such as the 2D image 700 in FIG. 7, may include a 2D projection 702 of the 3D object of the first traffic sign 606 in FIG. 6. Further, 1002 may be performed by the component 198 in FIG. 11.

At 1004, the UE may calculate at least one dimension of the plurality of dimensions of the at least one captured object based on the 2D projection of the at least one captured object. For example, 1004 may be performed by the UE 602 in FIG. 6, which may calculate seven dimensions of the tuple $(\tau_{cf}, R_{cf}, \alpha_f)$ representing the first traffic sign 606 based on the 2D projection 702 in FIG. 7. The seven dimensions may include two dimensions of the three-dimensions of $\tau_{cf}$, such as the two dimensions $\tau_{cf}(0{:}1)$, and may include the three dimensions that represent $R_{cf}$(e.g., Rodrigues angles or Euler angles), and may include the two dimensions of $\alpha_f$. Further, 1004 may be performed by the component 198 in FIG. 11.

At 1006, the UE may estimate an inverse depth of the plurality of dimensions of the at least one captured object based on information associated with one or more properties of the camera or one or more properties of at least one reference object associated with the at least one captured object. For example, 1006 may be performed by the UE 602 in FIG. 6, which may estimate an inverse depth $\tau_{cf}(2)$ of the tuple $(\tau_{cf}, R_{cf}, \alpha_f)$, which may represent the first traffic sign 606 based on the 2D projection 702 in FIG. 7. The estimate may be based on the resolution of the camera and/or may be based on the dimensions of a traffic sign associated with the first traffic sign 606. Further, 1006 may be performed by the component 198 in FIG. 11.

At 1008, the UE may transmit an indication of the plurality of dimensions of the at least one captured object including the calculated at least one dimension and the estimated inverse depth. For example, 1008 may be performed by the UE 602 in FIG. 6, which may transmit, via transmission 603, an indication of the calculated dimensions of the tuple $(\tau_{cf}, R_{cf}, \alpha_f)$ including the calculated two dimensions of such as $\tau_{cf}(0{:}1)$, the three dimensions of $R_{cf}$, and the two dimensions of $\alpha_f$, and the estimated inverse depth $\tau_{cf}(2)$ of the tuple $(\tau_{cf}, R_{cf}, \alpha_f)$. Further, 1008 may be performed by the component 198 in FIG. 11.

At 1010, the UE may calculate a depth covariance based on an inverse depth covariance associated with the inverse depth. For example, 1010 may be performed by the UE 602 in FIG. 6, which may calculate a depth covariance based on an inverse depth covariance associated with the inverse depth. The inverse depth covariance may be calculated based on historical data. The inverse depth covariance may be associated with a corresponding depth covariance that uses a standard measurement, such as a meters. Further, 1010 may be performed by the component 198 in FIG. 11.

At 1012, the UE may transmit the depth covariance associated with the estimated inverse depth. For example, 1012 may be performed by the UE 602 in FIG. 6, which may transmit the depth covariance associated with the estimated inverse depth. A receiving device, such as the RSU 622, may then use the depth covariance to determine whether the estimate is accurate enough to rely upon for further estimates/measurements/triggers. Further, 1012 may be performed by the component 198 in FIG. 11.

At 1014, the UE may detect at least one trigger event associated with the camera. For example, 1014 may be performed by the UE 602 in FIG. 6, which may detect at least one trigger event associated with the camera. The trigger event may be, for example, the fact that an image was captured by the camera, or may be an indication that the UE 602 has passed a threshold distance since a previous transmission, or may be a recognition of an object in an image captured by the camera (e.g., a recognition of a sign or a street identifier in the image). Further, 1014 may be performed by the component 198 in FIG. 11.

At 1016, the UE may transmit the indication of the plurality of dimensions in response to the detected at least one trigger event. For example, 1016 may be performed by the UE 602 in FIG. 6, which may transmit the indication of the plurality of dimensions in response to detecting the at least one trigger event. Further, 1016 may be performed by the component 198 in FIG. 11.

At 1018, the UE may obtain, from the camera, a set of images within a time period, where at least one of the set of images may not include the at least one captured object. For example, 1018 may be performed by the UE 602 in FIG. 6, which may obtain, from the camera, a set of images, which may include images such as the 2D image 700, within a time period, for example one second or half a second. At least one of the set of images may not include the at least one captured object. For example, one image may not include the 2D projection 702, while another image may include the 2D projection 702. Upon recognizing that the 2D projection 702 is a sign, the UE 602 may calculate the dimensions of the object that the 2D projection 702 is associated with. Further, 1018 may be performed by the component 198 in FIG. 11.

At 1020, the UE may identify the at least one trigger event based on the set of images. For example, 1020 may be performed by the UE 602 in FIG. 6, which may identify the at least one trigger event based on the set of images, for example the presence of an object or the movement of the UE 602 from one zone that is not associated with recognizing objects to another zone that is associated with recognizing objects. Further, 1020 may be performed by the component 198 in FIG. 11.

At 1022, the UE may transmit the indication of the plurality of dimensions in response to a depth covariance associated with the estimated inverse depth being less than or equal to a threshold value. For example, 1022 may be performed by the UE 602 in FIG. 6, which may transmit the indication of the plurality of dimensions in response to a depth covariance associated with the estimated inverse depth being less than or equal to a threshold value. The UE 602 may calculate the depth covariance based on the estimated inverse depth, and may be configured to trigger the transmission based on a comparison between the depth covariance and the threshold value. The threshold value may be configurable via a user interface of the UE 602. Further, 1022 may be performed by the component 198 in FIG. 11.

Figure 11:
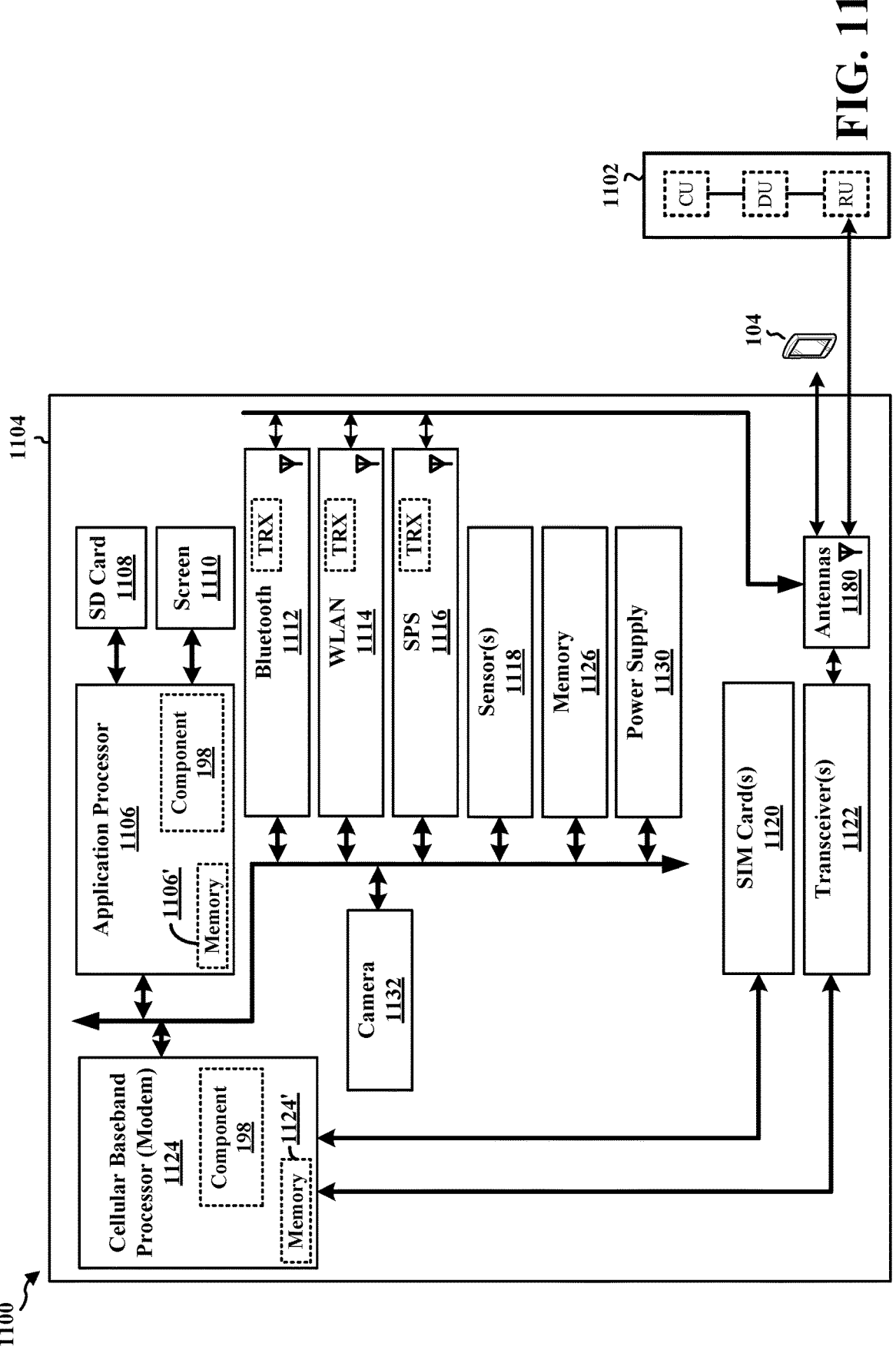
FIG. 11 is a diagram illustrating an example of a hardware implementation for an example apparatus and/or network entity.

FIG. 11 is a diagram 1100 illustrating an example of a hardware implementation for an apparatus 1104. The apparatus 1104 may be a UE, a component of a UE, or may implement UE functionality. In some aspects, the apparatus 1104 may include a cellular baseband processor 1124 (also referred to as a modem) coupled to one or more transceivers 1122 (e.g., cellular RF transceiver). The cellular baseband processor 1124 may include on-chip memory 1124'. In some aspects, the apparatus 1104 may further include one or more subscriber identity modules (SIM) cards 1120 and an application processor 1106 coupled to a secure digital (SD) card 1108 and a screen 1110. The application processor 1106 may include on-chip memory 1106'. In some aspects, the apparatus 1104 may further include a Bluetooth module 1112, a WLAN module 1114, an SPS module 1116 (e.g., GNSS module), one or more sensor modules 1118 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1126, a power supply 1130, and/or a camera 1132. The Bluetooth module 1112, the WLAN module 1114, and the SPS module 1116 may include an on-chip transceiver (TRx) (or in some cases, just a receiver (Rx)). The Bluetooth module 1112, the WLAN module 1114, and the SPS module 1116 may include their own dedicated antennas and/or utilize the antennas 1180 for communication. The cellular baseband processor 1124 communicates through the transceiver(s) 1122 via one or more antennas 1180 with the UE 104 and/or with an RU associated with a network entity 1102. The cellular baseband processor 1124 and the application processor 1106 may each include a computer-readable medium/memory 1124', 1106', respectively. The additional memory modules 1126 may also be considered a computer-readable medium/memory. Each computer-readable medium/memory 1124', 1106', 1126 may be non-transitory. The cellular baseband processor 1124 and the application processor 1106 are each responsible for general processing, including the execution of software stored on the computer-readable medium/memory. The software, when executed by the cellular baseband processor 1124/application processor 1106, causes the cellular baseband processor 1124/application processor 1106 to perform the various functions described supra. The computer-readable medium/memory may also be used for storing data that is manipulated by the cellular baseband processor 1124/application processor 1106 when executing software. The cellular baseband processor 1124/application processor 1106 may be a component of the UE 350 and may include the memory 360 and/or at least one of the Tx processor 368, the Rx processor 356, and the controller/processor 359. In one configuration, the apparatus 1104 may be a processor chip (modem and/or application) and include just the cellular baseband processor 1124 and/or the application processor 1106, and in another configuration, the apparatus 1104 may be the entire UE (e.g., see UE 350 of FIG. 3) and include the additional modules of the apparatus 1104.

As discussed supra, the component 198 may be configured to obtain, from a camera, an image with at least one captured object, which may include a plurality of dimensions. The image may include a 2D projection of the at least one captured object. The component 198 may be configured to calculate at least one dimension of the plurality of dimensions of the at least one captured object based on the 2D projection of the at least one captured object. The component 198 may be configured to estimate an inverse depth of the plurality of dimensions of the at least one captured object based on information associated with one or more properties of the camera or of at least one reference object associated with the at least one captured object. The component 198 may be configured to transmit an indication of the plurality of dimensions of the at least one captured object including the calculated at least one dimension and the estimated inverse depth. The component 198 may be within the cellular baseband processor 1124, the application processor 1106, or both the cellular baseband processor 1124 and the application processor 1106. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1104 may include a variety of components configured for various functions. In one configuration, the apparatus 1104, and in particular the cellular baseband processor 1124 and/or the application processor 1106, may include means for obtaining, from a camera, an image with at least one captured object. The apparatus 1104 may further include means for calculating at least one dimension of the plurality of dimensions of the at least one captured object based on the 2D projection of the at least one captured object. The apparatus 1104 may further include means for estimating an inverse depth of the plurality of dimensions of the at least one captured object based on information associated with one or more properties of the camera or one or more properties of at least one reference object associated with the at least one captured object. The apparatus 1104 may further include means for transmitting an indication of the plurality of dimensions of the at least one captured object including the calculated at least one dimension and the estimated inverse depth. The apparatus 1104 may further include means for associating the plurality of corner points with a non-linear least-squares solver. The apparatus 1104 may further include means for estimating the at least one dimension based on the non-linear least-squares solver. The apparatus 1104 may further include means for calculating the at least one dimension of the plurality of dimensions based on the 2D projection of the at least one captured object. The apparatus 1104 may further include means for calculating at least two dimensions in the three dimensions of the depth-normalized position based on the 2D projection of the at least one captured object. The apparatus 1104 may further include means for calculating at least three dimensions of the three dimensions of the orientation based on the 2D projection of the at least one captured object. The apparatus 1104 may further include means for calculating the two dimensions of the depth-normalized size based on the 2D projection of the at least one captured object. The apparatus 1104 may further include means for detecting at least one trigger event associated with the camera. The apparatus 1104 may further include means for transmitting the indication of the plurality of dimensions in response to detecting the at least one trigger event. The apparatus 1104 may further include means for obtaining, from the camera, a set of images within a time period. The apparatus 1104 may further include transmitting the indication of the plurality of dimensions by transmitting the indication of the plurality of dimensions in response to a depth covariance associated with the estimated inverse depth being less than or equal to a threshold value. The apparatus 1104 may further include transmitting a depth covariance associated with the estimated inverse depth. The apparatus 1104 may further include calculating the depth covariance based on an inverse depth covariance associated with the inverse depth. The means may be the component 198 of the apparatus 1104 configured to perform the functions recited by the means. As described supra, the apparatus 1104 may include the Tx processor 368, the Rx processor 356, and the controller/processor 359. As such, in one configuration, the means may be the Tx processor 368, the Rx processor 356, and/or the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data.

The following aspects are illustrative only and may be combined with other aspects or teachings described herein, without limitation.

Aspect 1 is a method of wireless communication at a wireless device, for example a user equipment (UE), including obtaining, from a camera, an image with at least one captured object. The at least one captured object may include a plurality of dimensions. The image may include a two-dimensional (2D) projection of the at least one captured object. The method may further include calculating at least one dimension of the plurality of dimensions of the at least one captured object based on the 2D projection of the at least one captured object. The method may further include estimating an inverse depth of the plurality of dimensions of the at least one captured object based on information associated with one or more properties of the camera or one or more properties of at least one reference object associated with the at least one captured object. The method may further include transmitting an indication of the plurality of dimensions of the at least one captured object including the calculated at least one dimension and the estimated inverse depth.

Aspect 2 is the method of aspect 1, where the image may include a 2D image and the at least one captured object may include a three-dimensional (3D) object. A portion of the 2D image may include the 2D projection of the at least one captured object.

Aspect 3 is the method of aspect 2, where the at least one reference object may include a traffic sign.

Aspect 4 is the method of any of aspects 1 to 3, where the 2D projection of the at least one captured object may include a plurality of corner points of the at least one captured object.

Aspect 5 is the method of aspect 4, where calculating the at least one dimension of the plurality of dimensions may include associating the plurality of corner points with a non-linear least-squares solver. Calculating the at least one dimension of the plurality of dimensions may also include estimating the at least one dimension based on the non-linear least-squares solver.

Aspect 6 is the method of any of aspects 1 to 5, where calculating the at least one dimension of the plurality of dimensions may include calculating the at least one dimension of the plurality of dimensions based on the 2D projection of the at least one captured object.

Aspect 7 is the method of any of aspects 1 to 6, where the plurality of dimensions may include at least one of (a) a depth-normalized position, (b) an orientation, or (c) a depth-normalized size.

Aspect 8 is the method of aspect 7, where the depth-normalized position may include three dimensions of the plurality of dimensions. One of the three dimensions may include the inverse depth.

Aspect 9 is the method of aspect 8, where calculating the at least one dimension of the plurality of dimensions may include calculating at least two dimensions of the three dimensions of the depth-normalized position based on the 2D projection of the at least one captured object.

Aspect 10 is the method of any of aspects 7 to 9, where the orientation may include three dimensions of the plurality of dimension.

Aspect 11 is the method of aspect 10, where calculating the at least one dimension of the plurality of dimensions may include calculating at least three dimensions of the three dimensions of the orientation based on the 2D projection of the at least one captured object.

Aspect 12 is the method of any of aspects 7 to 11, where the depth-normalized size may include two dimensions of the plurality of dimensions.

Aspect 13 is the method of aspect 12, where calculating the at least one dimension of the plurality of dimensions may include calculating the two dimensions of the depth-normalized size based on the 2D projection of the at least one captured object.

Aspect 14 is the method of any of aspects 1 to 13, where the one or more properties of the camera may include at least one of a camera type or a resolution of the camera.

Aspect 15 is the method of any of aspects 1 to 14, where the indication of the plurality of dimensions may include at least one of a diagonal element of a covariance matrix or a function of the diagonal element of the covariance matrix.

Aspect 16 is the method of any of aspects 1 to 15, further including detecting at least one trigger event associated with the camera, where transmitting the indication of the plurality of dimensions is in response to detecting the at least one trigger event.

Aspect 17 is the method of aspect 16, further including detecting the at least one trigger event associated with the camera by obtaining, from the camera, a set of images within a time period. At least one of the set of images may not include the at least one captured object.

Aspect 18 is the method of aspect 1, wherein transmitting the indication of the plurality of dimensions may include transmitting the indication of the plurality of dimensions in response to a depth covariance associated with the estimated inverse depth being less than or equal to a threshold value.

Aspect 19 is the method of aspect 1, where the method may include transmitting a depth covariance associated with the estimated inverse depth.

Aspect 20 is the method of aspect 19, where the method may include calculating the depth covariance based on an inverse depth covariance associated with the inverse depth.

Aspect 21 is an apparatus for wireless communication at a wireless device, including:
at least one memory; and at least one processor coupled to the at least one memory and, based at least in part on information stored in the at least one memory, the at least one processor is configured to implement any of aspects 1 to 20.

Aspect 22 is the apparatus of aspect 21, further including at least one of an antenna or a transceiver coupled to the at least one processor.

Aspect 23 is an apparatus for wireless communication including means for implementing any of aspects 1 to 20.

Aspect 24 is a computer-readable medium (e.g., a non-transitory computer-readable medium) storing computer executable code, where the code when executed by a processor causes the processor to implement any of aspects 1 to 20.

What is claimed is:

1. An apparatus for wireless communication at a wireless device, comprising:
at least one memory; and
at least one processor coupled to the at least one memory and, based at least in part on information stored in the at least one memory, the at least one processor is configured to:
obtain, from a camera, an image with at least one captured object, wherein the at least one captured object includes a plurality of dimensions and wherein the image includes a two-dimensional (2D) projection of the at least one captured object;
calculate at least one dimension of the plurality of dimensions of the at least one captured object based on the 2D projection of the at least one captured object;
estimate an inverse depth of the plurality of dimensions of the at least one captured object based on first information associated with a first set of properties of the camera or a second set of properties of at least one reference object associated with the at least one captured object; and
transmit an indication of the plurality of dimensions of the at least one captured object including the calculated at least one dimension and the estimated inverse depth.

2. The apparatus of claim 1, wherein the image is a 2D image and the at least one captured object is a three-dimensional (3D) object, wherein a portion of the 2D image includes the 2D projection of the at least one captured object.

3. The apparatus of claim 2, wherein the at least one reference object comprises a traffic sign.

4. The apparatus of claim 1, wherein the 2D projection of the at least one captured object includes a plurality of corner points of the at least one captured object.

5. The apparatus of claim 4, wherein to calculate the at least one dimension of the plurality of dimensions, the at least one processor is configured to:
associate the plurality of corner points with a non-linear least-squares solver; and
estimate the at least one dimension based on the non-linear least-squares solver.

6. The apparatus of claim 1, wherein to calculate the at least one dimension of the plurality of dimensions, the at least one processor is configured to:
calculate the at least one dimension of the plurality of dimensions based on the 2D projection of the at least one captured object.

7. The apparatus of claim 1, wherein the plurality of dimensions includes at least one of: a depth-normalized position, an orientation, or a depth-normalized size.

8. The apparatus of claim 7, wherein the depth-normalized position comprises three dimensions of the plurality of dimensions, wherein one of the three dimensions comprises the inverse depth.

9. The apparatus of claim 8, wherein to calculate the at least one dimension of the plurality of dimensions, the at least one processor is configured to:
calculate at least two dimensions of the three dimensions of the depth-normalized position based on the 2D projection of the at least one captured object.

10. The apparatus of claim 7, wherein the orientation comprises three dimensions of the plurality of dimensions.

11. The apparatus of claim 10, wherein to calculate the at least one dimension of the plurality of dimensions, the at least one processor is configured to:
calculate the three dimensions of the orientation based on the 2D projection of the at least one captured object.

12. The apparatus of claim 7, wherein the depth-normalized size comprises two dimensions of the plurality of dimensions.

13. The apparatus of claim 12, wherein to calculate the at least one dimension of the plurality of dimensions, the at least one processor is configured to:
calculate the two dimensions of the depth-normalized size based on the 2D projection of the at least one captured object.

14. The apparatus of claim 1, wherein the first set of properties of the camera include at least one of a camera type or a resolution of the camera.

15. The apparatus of claim 1, wherein the indication of the plurality of dimensions includes at least one of a diagonal element of a covariance matrix or a function of the diagonal element of the covariance matrix.

16. The apparatus of claim 1, wherein the at least one processor is further configured to:
detect at least one trigger event associated with the camera, and wherein, to transmit the indication of the plurality of dimensions, the at least one processor is configured to transmit the indication of the plurality of dimensions in response to the detected at least one trigger event.

17. The apparatus of claim 16, wherein to detect the at least one trigger event associated with the camera, the at least one processor is configured to:

obtain, from the camera, a set of images within a time period, wherein at least one of the set of images do not include the at least one captured object; and identify the at least one trigger event based on the set of images.

18. The apparatus of claim 1, wherein, to transmit the indication of the plurality of dimensions, the at least one processor is configured to:

transmit the indication of the plurality of dimensions in response to a depth covariance associated with the estimated inverse depth being less than or equal to a threshold value.

19. The apparatus of claim 1, wherein the at least one processor is further configured to:

transmit a depth covariance associated with the estimated inverse depth.

20. The apparatus of claim 19, wherein the at least one processor is further configured to:

calculate the depth covariance based on an inverse depth covariance associated with the inverse depth.

21. The apparatus of claim 1, further comprising a transceiver coupled to the at least one processor, wherein, to transmit the indication of the plurality of dimensions, the at least one processor is configured to:

transmit, via the transceiver, the indication of the plurality of dimensions.

22. A method of wireless communication at a wireless device, comprising:

obtaining, from a camera, an image with at least one captured object, wherein the at least one captured object includes a plurality of dimensions and wherein the image includes a two-dimensional (2D) projection of the at least one captured object;

calculating at least one dimension of the plurality of dimensions of the at least one captured object based on the 2D projection of the at least one captured object;

estimating an inverse depth of the plurality of dimensions of the at least one captured object based on information associated with a first set of properties of the camera or a second set of properties of at least one reference object associated with the at least one captured object; and transmitting an indication of the plurality of dimensions of the at least one captured object including the calculated at least one dimension and the estimated inverse depth.

23. The method of claim 22, wherein the 2D projection of the at least one captured object includes a plurality of corner points of the at least one captured object, wherein calculating the at least one dimension of the plurality of dimensions comprises:

associating the plurality of corner points with a non-linear least-squares solver; and estimating the at least one dimension based on the non-linear least-squares solver.

24. The method of claim 22, wherein calculating the at least one dimension of the plurality of dimensions comprises calculating the at least one dimension of the plurality of dimensions based on the 2D projection of the at least one captured object.

25. The method of claim 22, wherein the plurality of dimensions includes at least one of: a depth-normalized position, an orientation, or a depth-normalized size.

26. The method of claim 25, wherein the depth-normalized position comprises three dimensions of the plurality of dimensions, wherein one of the three dimensions comprises the inverse depth, wherein calculating the at least one dimension of the plurality of dimensions comprises calculating at least two dimensions of the three dimensions of the depth-normalized position based on the 2D projection of the at least one captured object.

27. The method of claim 25, wherein the orientation comprises three dimensions of the plurality of dimensions, wherein calculating the at least one dimension of the plurality of dimensions comprises calculating at least three dimensions of the three dimensions of the orientation based on the 2D projection of the at least one captured object.

28. The method of claim 25, wherein the depth-normalized size comprises two dimensions of the plurality of dimensions, wherein calculating the at least one dimension of the plurality of dimensions comprises calculating the two dimensions of the depth-normalized size based on the 2D projection of the at least one captured object.

29. An apparatus for wireless communication at a wireless device, comprising:

means for obtaining, from a camera, an image with at least one captured object, wherein the at least one captured object includes a plurality of dimensions and wherein the image includes a two-dimensional (2D) projection of the at least one captured object;

means for calculating at least one dimension of the plurality of dimensions of the at least one captured object based on the 2D projection of the at least one captured object;

means for estimating an inverse depth of the plurality of dimensions of the at least one captured object based on information associated with a first set of properties of the camera or a second set of properties of at least one reference object associated with the at least one captured object; and means for transmitting an indication of the plurality of dimensions of the at least one captured object including the calculated at least one dimension and the estimated inverse depth.

30. A non-transitory computer-readable medium storing computer executable code at a wireless device, the code when executed by a processor causes the processor to:

obtain, from a camera, an image with at least one captured object, wherein the at least one captured object includes a plurality of dimensions and wherein the image includes a two-dimensional (2D) projection of the at least one captured object;

calculate at least one dimension of the plurality of dimensions of the at least one captured object based on the 2D projection of the at least one captured object;

estimate an inverse depth of the plurality of dimensions of the at least one captured object based on information associated with a first set of properties of the camera or a second set of properties of at least one reference object associated with the at least one captured object; and transmit an indication of the plurality of dimensions of the at least one captured object including the calculated at least one dimension and the estimated inverse depth.

* * * * *